US012168494B2

(12) United States Patent
Ogawa

(10) Patent No.: US 12,168,494 B2
(45) Date of Patent: Dec. 17, 2024

(54) CONVEYANCE SEAT DEVICE

(71) Applicant: TS TECH CO., LTD., Asaka (JP)

(72) Inventor: Tatsuro Ogawa, Tochigi (JP)

(73) Assignee: TS TECH CO., LTD., Asaka (JP)

(*) Notice: Subject to any disclaimer, the term of this patent is extended or adjusted under 35 U.S.C. 154(b) by 428 days.

(21) Appl. No.: 17/605,262

(22) PCT Filed: Apr. 20, 2020

(86) PCT No.: PCT/JP2020/017084
§ 371 (c)(1),
(2) Date: Oct. 21, 2021

(87) PCT Pub. No.: WO2020/218252
PCT Pub. Date: Oct. 29, 2020

(65) Prior Publication Data
US 2022/0204103 A1 Jun. 30, 2022

(30) Foreign Application Priority Data
Apr. 22, 2019 (JP) .................. 2019-081289

(51) Int. Cl.
*B62J 1/08* (2006.01)
(52) U.S. Cl.
CPC ...................... *B62J 1/08* (2013.01)
(58) Field of Classification Search
CPC ................... B62J 1/065; B62J 1/08
See application file for complete search history.

(56) References Cited

U.S. PATENT DOCUMENTS 3,086,742 A * 4/1963 Severson ............... B60N 2/508
248/575
5,702,093 A * 12/1997 Liao ........................ B62J 1/065
267/132
(Continued)

FOREIGN PATENT DOCUMENTS

CN 206615294 11/2017
EP 1783039 5/2007
(Continued)

OTHER PUBLICATIONS

Partial Supplementary European Search Report for corresponding European Patent Application No. 20794123.8, dated May 19, 2022, 41 pages.
(Continued)

*Primary Examiner* — Philip F Gabler
(74) *Attorney, Agent, or Firm* — Dority & Manning, P.A.

(57) ABSTRACT

A conveyance seat includes a saddle-type seat on which an occupant sits to straddle and a seat height adjustment unit which is attached below the seat and is able to adjust a height position of the seat. The seat height adjustment unit includes a rotation link which rotates together with the seat with respect to a chassis to adjust a height position of the seat, an upper link support member that is provided between the seat and the rotation link and is used so that an upper end portion of the rotation link is attached thereto, a lower link support member that is provided between the rotation link and the chassis and is used so that a lower end portion of the rotation link is attached thereto, and a flexible cover member that covers the rotation link from the outside in a front to back direction of the seat and a width direction of the seat.

20 Claims, 15 Drawing Sheets

(56) References Cited

U.S. PATENT DOCUMENTS

| | | | |
|---|---|---|---|
| 10,086,893 B2* | 10/2018 | Ogawa | B62J 1/12 |
| 10,093,370 B2* | 10/2018 | Ogawa | B62J 1/12 |
| 2003/0011229 A1 | 1/2003 | Bell | |
| 2012/0126589 A1* | 5/2012 | Kawatani | B62J 25/08 |
| | | | 297/452.56 |
| 2013/0200242 A1 | 8/2013 | Legris | |
| 2015/0175229 A1* | 6/2015 | Chiba | B60N 2/686 |
| | | | 297/452.18 |
| 2016/0090137 A1* | 3/2016 | Mori | B60N 2/40 |
| | | | 701/49 |
| 2016/0176326 A1 | 6/2016 | Catton et al. | |
| 2018/0141604 A1* | 5/2018 | Uchiumi | B62J 1/065 |
| 2018/0230675 A1* | 8/2018 | Kato | E02D 17/13 |

FOREIGN PATENT DOCUMENTS

| | | |
|---|---|---|
| GB | 1129592 | 10/1968 |
| JP | S63007081 | 1/1988 |
| JP | H10129314 | 5/1998 |
| JP | 3101384 U | 6/2004 |
| JP | 2006-088727 A | 4/2006 |
| JP | 2013-006504 A | 1/2013 |
| JP | 2015-033899 A | 2/2015 |
| JP | 2019-038508 A | 3/2019 |
| KR | 101224150 | 1/2013 |

OTHER PUBLICATIONS

Extended European Search Report for corresponding European Application No. 20794123.8, dated Aug. 8, 2022, 13 pages.
International Search Report and Written Opinion With English Translation issued in PCT/JP2020/017084, Dated Jun. 16, 2020 (9 gages).

* cited by examiner

CONVEYANCE SEAT DEVICE

CROSS REFERENCE TO RELATED APPLICATIONS

This application is the U.S. National Stage entry of International Application No. PCT/JP2020/017084 filed under the Patent Cooperation Treaty and having a filing date of Apr. 20, 2020, which claims priority to Japanese Patent Application No. 2019-081289 having a filing date of Apr. 22, 2019, both of which are incorporated herein by reference.

TECHNICAL FIELD

The present invention relates to a conveyance seat device and more particularly to a conveyance seat device including a saddle-type seat on which an occupant sits so as to straddle.

BACKGROUND ART

Conventionally, a conveyance seat device including a saddle-type seat used for motorcycles, snow bikes, personal watercraft, or the like and a seat height adjustment unit capable of adjusting a height position of the seat is known and various techniques for compactly disposing the seat height adjustment unit and for efficiently operating the seat height adjustment unit have been proposed (for example, see Patent Citation 1).

For example, in the conveyance seat device described in Patent Citation 1, the seat height adjustment unit includes a seat support plate which supports the seat from below, rotation links which rotate together with the support plate when adjusting the position of the seat and in which one of the rotation links serves as a drive link, and a motor device which operates the drive link and the rotation links include a front link and a rear link which are provided at different positions in a front to back direction of the seat. Then, the front link and the rear link are attached to a portion located directly below buttocks of an occupant when the occupant sits on the seat in the seat support plate.

With the above-described configuration, a seat portion on which the buttocks of the occupant rest can be efficiently moved by the rotation operation of each rotation link when adjusting the height position of the seat.

CITATION LIST

Patent Literature

PATENT LITERATURE 1: JP 2019-38508 A

SUMMARY OF INVENTION

Technical Problem

Incidentally, in the conveyance seat device of Patent Literature 1, the seat height adjustment unit includes the motor device or the rotation link (drive link) for adjusting the height position of the seat. Therefore, in order to appropriately operate the rotation link or the motor device, it has been required to devise so that foreign matter such as dust and dirt does not enter from the outside as much as possible in the moving portion.

Particularly, in a saddle-type seat for motorcycles or the like which is a seat capable of adjusting a height position of the seat, since the seat is directly exposed to wind and rain, it has been required to further protect the seat from foreign matter.

The present invention has been made in view of the above-described problems and an object of the present invention is to provide a conveyance seat device capable of appropriately protecting components of a seat height adjustment unit capable of adjusting a height position of the seat from the outside.

Solution to Problem

According to a conveyance seat device of the present invention, the above-described problems are solved by a conveyance seat device including: a seat on which an occupant of a conveyance sits; and a seat height adjustment unit which is attached below the seat and is able to adjust a height position of the seat, wherein the seat height adjustment unit includes a rotation link which rotates together with the seat with respect to a main body of the conveyance to adjust the height position of the seat and a flexible cover member that covers the rotation link from the outside in a front to back direction of the seat and a width direction of the seat.

With the above-described configuration, it is possible to realize the conveyance seat device capable of appropriately protecting the component (rotation link) operated to adjust the height position of the seat from the outside.

Specifically, since the rotation link is covered by the flexible cover member, it is possible to change the shape of the cover member in accordance with the vertical movement of the seat even when the seat moves vertically in the height direction and hence to protect the rotation link from foreign matter such as dust and dirt at all times.

At this time, the seat is a saddle-type seat on which the occupant sits to straddle, the seat height adjustment unit may include a plate-shaped upper link support member that is provided between the seat and the rotation link and is used so that an upper end portion of the rotation link is attached thereto and a lower link support member that is provided between the rotation link and the main body of the conveyance and is used so that a lower end portion of the rotation link is attached thereto, and the rotation link may be covered by the cover member, the upper link support member, and the lower link support member.

With the above-described configuration, it is possible to appropriately protect the rotation link from the outside in the saddle-type seat for motorcycles or the like directly exposed to wind and rain.

Further, since the rotation link is covered by the cover member, the upper link support member, and the lower link support member, it is possible to protect the rotation link not only from the outside in the front to back direction of the seat and the width direction of the seat, but also from the outside in the up to down direction of the seat.

At this time, the cover member may have a bag shape and may be configured to wrap the rotation link, the upper link support member, and the lower link support member.

With the above-described configuration, it is possible to protect the operation portion of the seat height adjustment unit (rotation link) and the peripheral portion from foreign matter such as dust, dirt, and water from entering as much as possible from the outside.

At this time, the cover member may be a polyhedron which is formed by joining terminals of a plurality of seat materials and a portion formed by joining the terminals may be located on a ridge of the cover member.

With the above-described configuration, it is possible to easily manufacture the cover member formed as a polyhedron.

At this time, the seat height adjustment unit may be able to move the seat between a normal position and an upper position in which the seat is moved above the normal position, the cover member may change its shape in accordance with a movement operation of the seat and may be configured to be folded when the seat moves from the upper position to the normal position, and the cover member may include a cover overhanging portion which is provided so that a lateral portion corresponding to the rotation link in the cover member projects outward when the cover member is folded.

With the above-described configuration, it is possible to ensure a clearance between the rotation link and the lateral portion of the cover member when the rotation link moving together with the seat moves from the upper position to the normal position so that the cover member is folded. Therefore, it is possible to suppress the lateral portion of the cover member from being sandwiched between the rotation link and the link support member.

At this time, the cover overhanging portion may be formed by bending a part of the lateral portion of the cover member outward and may be disposed at a peripheral position of a corner portion located at a position closest to the rotation link among a plurality of corner portions in the lateral portion of the cover member.

Further, the cover overhanging portion may be formed by joining the bent portion and may be disposed between two ridges defining the corner portions in the lateral portion of the cover member.

With the above-described configuration, it is possible to further suppress the lateral portion of the cover member from being sandwiched between the rotation link and the link support member when the cover member is folded. As a result, it is possible to more smoothly operate the seat height adjustment unit.

At this time, the rotation link may include a front link and a rear link which are disposed at different positions in the front to back direction of the seat and the cover overhanging portion may be disposed at a lateral portion corresponding to a link serving as a drive link in the front link and the rear link and extend along a center line between two ridges defining the corner portion while starting from the corner portion located at a position closest to the drive link in the lateral portion of the cover member.

With the above-described configuration, since it is possible to appropriately protect the link which is particularly the drive link in the front and rear rotation links from the outside, it is possible to more smoothly operate the seat height adjustment unit.

At this time, each of an upper surface and a bottom surface of the cover member may be provided with an opening hole taking in or taking out components of the seat height adjustment unit, the upper opening hole formed in the upper surface of the cover member may be disposed at a position corresponding to an upper surface of the upper link support member, and the lower opening hole formed in the bottom surface of the cover member may be disposed at a position corresponding to a bottom surface of the lower link support member.

With the above-described configuration, the rotation link, the upper link support member, and the lower link support member which are the components of the seat height adjustment unit can be easily taken in the cover member or taken out of the cover member.

Further, since the cover member covers these components from the outside substantially as a whole, the protection function by the cover member is improved.

At this time, a center hole portion provided at a center portion of each of the upper surface and the bottom surface of the cover member and a plurality of slit hole portions radially extending from the center hole portion and having a slit shape may be formed as the opening hole formed in each of the upper surface and the bottom surface of the cover member, the upper surface and the bottom surface of the cover member may be respectively provided with an upper cover attachment portion and a lower cover attachment portion used to be attached to the upper link support member and the lower link support member, and each of the upper cover attachment portion and the lower cover attachment portion may be disposed between the slit hole portions formed to be adjacent to each other in the surface of the cover member.

With the above-described configuration, the opening hole and the cover attachment portion can be arranged in each of the upper surface and the bottom surface of the cover member without interference. Therefore, the components of the seat height adjustment unit can be easily taken in and out of the cover member. Further, it is also possible to increase the attachment rigidity between the cover member and the upper and lower link support members.

At this time, the conveyance seat device may further include a vibration suppressing member that is attached between the seat height adjustment unit and the main body of the conveyance in an up to down direction and suppresses vibration transmitted from the main body of the conveyance to the seat height adjustment unit and a plurality of the vibration suppressing members may be arranged at predetermined intervals in the front to back direction of the seat and the width direction of the seat.

With the above-described configuration, it is possible to efficiently suppress the vibration transmitted from the main body of the conveyance to the seat height adjustment unit and to protect the components of the seat height adjustment unit.

At this time, the seat height adjustment unit may include a chassis attachment plate which is attached onto the main body of the conveyance, a chassis assembly portion for vertically assembling to an assembled portion provided in the main body of the conveyance may be formed in the chassis attachment plate, and the vibration suppressing member may be attached to the chassis assembly portion or the assembled portion.

With the above-described configuration, it is possible to efficiently attach the seat height adjustment unit and the vibration suppressing member onto the main body of the conveyance.

At this time, the chassis attachment plate may be attached onto the main body of the conveyance by assembling an assembly bolt while a chassis assembly hole serving as the chassis assembly portion and an assembly hole serving as the assembled portion communicate with each other, the vibration suppressing member may be fitted and attached to the chassis assembly hole, and the vibration suppressing member may include a through hole through which the assembly bolt penetrates.

With the above-described configuration, the vibration suppressing member is easily attached and the vibration suppressing member is hard to come off after the vibration suppressing member is attached.

At this time, the seat height adjustment unit may include a lower link support member that is provided between the rotation link and the chassis attachment plate and is used so that a lower end portion of the rotation link is attached thereto, the chassis attachment plate may be provided with an attachment portion for vertically attaching to an attached portion provided in the lower link support member, the vibration suppressing member may include a first vibration suppressing member that is attached to the chassis assembly portion or the assembled portion and a second vibration suppressing member that is attached to the attachment portion or the attached portion, and a plurality of the first vibration suppressing members may be arranged to sandwich the second vibration suppressing member in the front to back direction of the seat and the width direction of the seat.

As described above, since the arrangement pattern of the first vibration suppressing member and the second vibration suppressing member is devised, it is possible to further efficiently suppress the vibration transmitted from the main body of the conveyance to the seat height adjustment unit.

Advantageous Effects of Invention

According to the present invention, it is possible to realize the conveyance seat device capable of appropriately protecting the component (rotation link) operated to adjust the height position of the seat from the outside.

Further, according to the present invention, it is possible to appropriately protect the rotation link from the outside in the saddle-type seat of motorcycles or the like directly exposed to wind and rain. Further, it is possible to protect the rotation link not only from the outside in the front to back direction of the seat and the width direction of the seat, but also from the outside in the up to down direction of the seat.

Further, according to the present invention, it is possible to protect the operation portion of the seat height adjustment unit (rotation link) from foreign matter such as dust, dirt, and water from entering as much as possible from the outside.

Further, according to the present invention, it is possible to easily manufacture the cover member formed as a polyhedron.

Further, according to the present invention, it is possible to suppress the lateral portion of the cover member from being sandwiched between the rotation link and the link support member.

Further, according to the present invention, it is possible to more smoothly operate the seat height adjustment unit.

Further, according to the present invention, the rotation link, the upper link support member, and the lower link support member which are the components of the seat height adjustment unit can be taken in the cover member or out of the cover member. Further, the protection function by the cover member is improved.

Further, according to the present invention, the components of the seat height adjustment unit can be easily taken in and out of the cover member. Further, it is also possible to increase the attachment rigidity between the cover member and the upper and lower link support members.

Further, according to the present invention, it is possible to efficiently suppress the vibration transmitted from the main body of the conveyance to the seat height adjustment unit and to protect the components of the seat height adjustment unit.

Further, according to the present invention, it is possible to efficiently attach the seat height adjustment unit and the vibration suppressing member onto the main body of the conveyance.

Further, according to the present invention, the vibration suppressing member can be easily attached and the vibration suppressing member is hard to come off after the vibration suppressing member is attached.

Further, according to the present invention, it is possible to further efficiently suppress the vibration transmitted from the main body of the conveyance to the seat height adjustment unit.

DESCRIPTION OF EMBODIMENTS

Hereinafter, a conveyance seat device according to an embodiment of the present invention will be described with reference to FIGS. 1 to 17.

This embodiment relates to the present invention of a conveyance seat device including: a saddle-type seat on which an occupant sits to straddle; and a seat height adjustment unit which is attached below the seat and is able to adjust a height position of the seat, wherein the seat height adjustment unit includes a rotation link which rotates together with the seat with respect to a main body of the conveyance to adjust the height position of the seat, an upper link support member that is provided between the seat and the rotation link and is used so that an upper end portion of the rotation link is attached thereto, a lower link support member that is provided between the rotation link and the main body of the conveyance and is used so that a lower end portion of the rotation link is attached thereto, and a flexible cover member that covers the rotation link from the outside in a front to back direction of the seat and a width direction of the seat.

Figure 1:
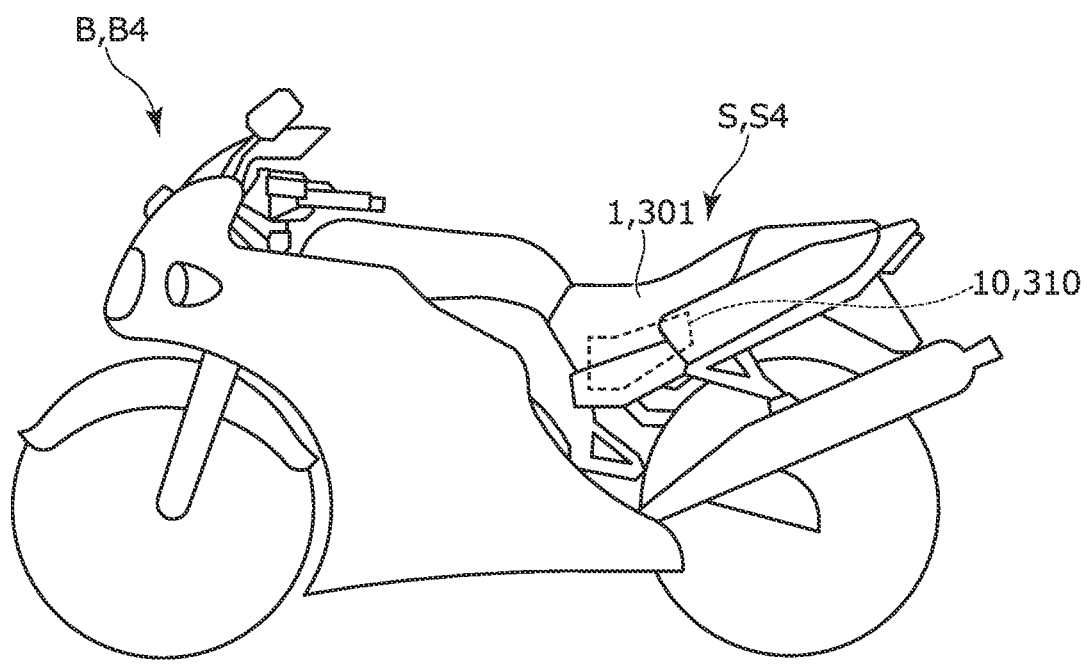
FIG. 1 is a diagram showing a motorcycle equipped with a conveyance seat device of this embodiment.
Figure 2:
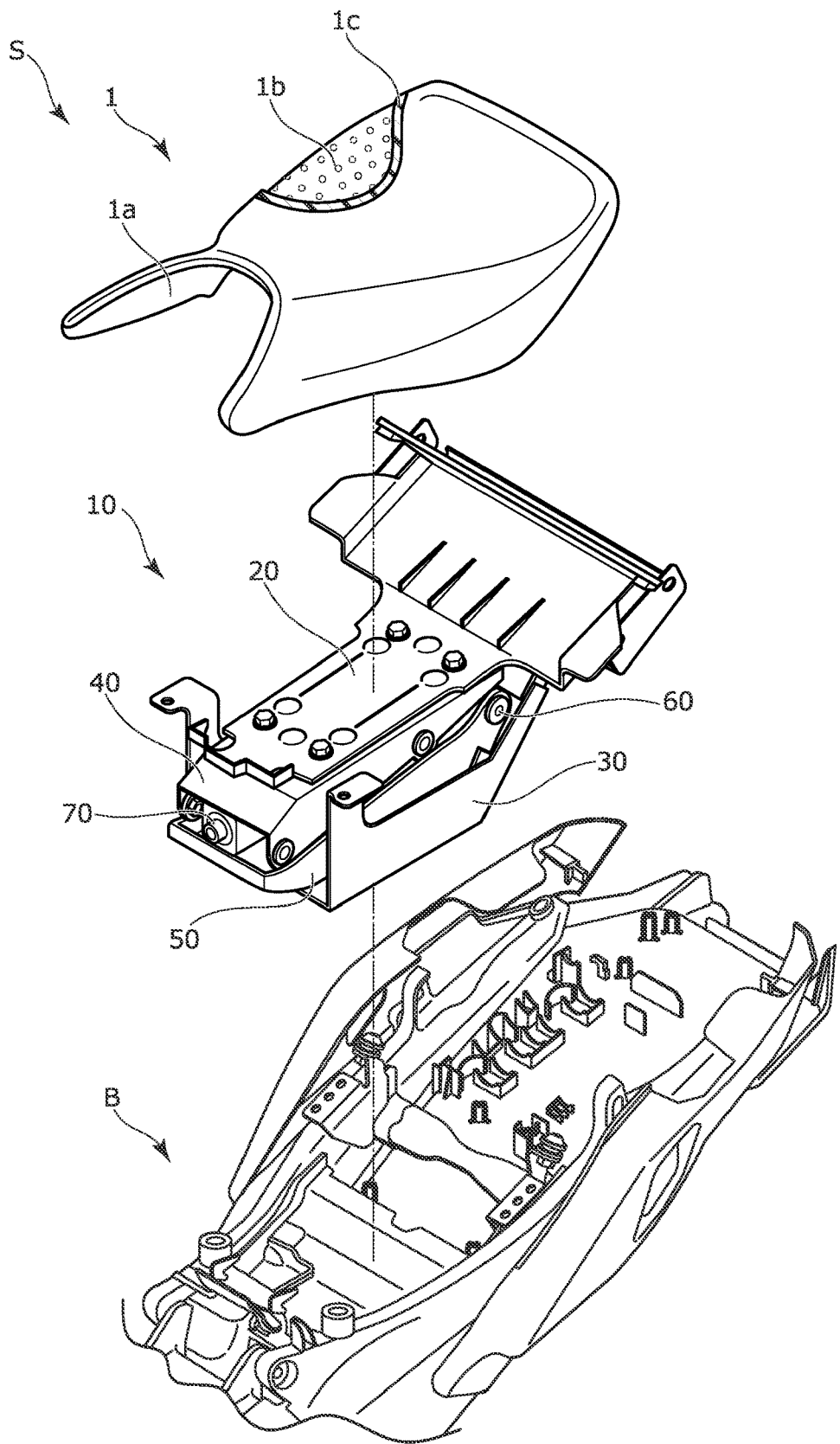
FIG. 2 is an exploded perspective view of a seat, a seat height adjustment unit, and a chassis.

As shown in FIGS. 1 and 2, a seat device S of this embodiment is a conveyance seat device including a seat 1 on which an occupant of a motorcycle sits and a seat height adjustment unit 10 which is attached below the seat 1 and is able to adjust a height position of the seat 1 and is set and attached onto a chassis B.

At this time, the seat height adjustment unit 10 is attached into the chassis B and is disposed between the seat 1 and the chassis B in the up to down direction.

As shown in FIGS. 1 and 2, the seat 1 is a member that constitutes a seating portion of a motorcycle and mainly includes a bottom plate 1a which is a base board, a cushion material 1b which is placed on the bottom plate 1a, and a skin material 1c which covers the bottom plate 1a and the cushion material 1b.

Additionally, the seat 1 is subjected to a skin terminal treatment in which a skin terminal portion serving as a terminal of the skin material 1c is attached to a back surface of the bottom plate 1a by using an attachment member such as a tacker needle.

The bottom plate 1a is made of a plate-shaped synthetic resin molded product made of polypropylene, polyethylene, or the like, and the cushion material 1b is made of an elastic member using urethane foam or the like.

The skin material 1c is made of a covering material using polyvinyl chloride leather or the like, and is suitable as a skin material for motorcycles that are directly exposed to wind and rain.

As shown in FIG. 2, the seat 1 is supported from below by the chassis B and a seat support plate 20 and is detachably attached onto the seat support plate 20.

Further, the seat 1 can move in the up to down direction with respect to the chassis B by operating the seat height adjustment unit 10 through the operation of the operation button by the occupant.

Therefore, it is possible to adjust the seat height in accordance with the physique of the occupant and the preference of the occupant or to adjust the seat height in accordance with the traveling speed of the motorcycle.

Figure 3:
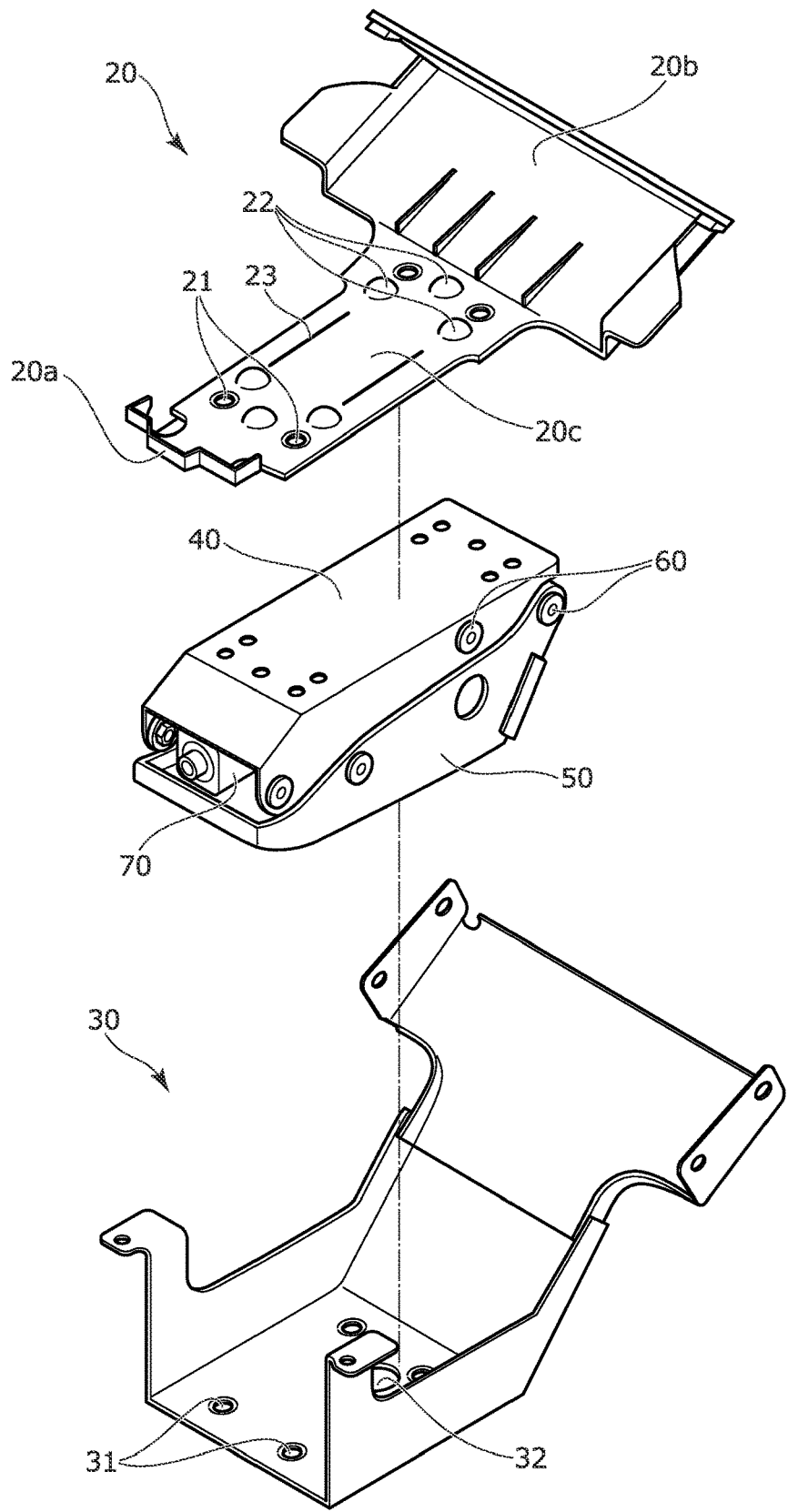
FIG. 3 is an exploded perspective view of the seat height adjustment unit.
Figure 4:
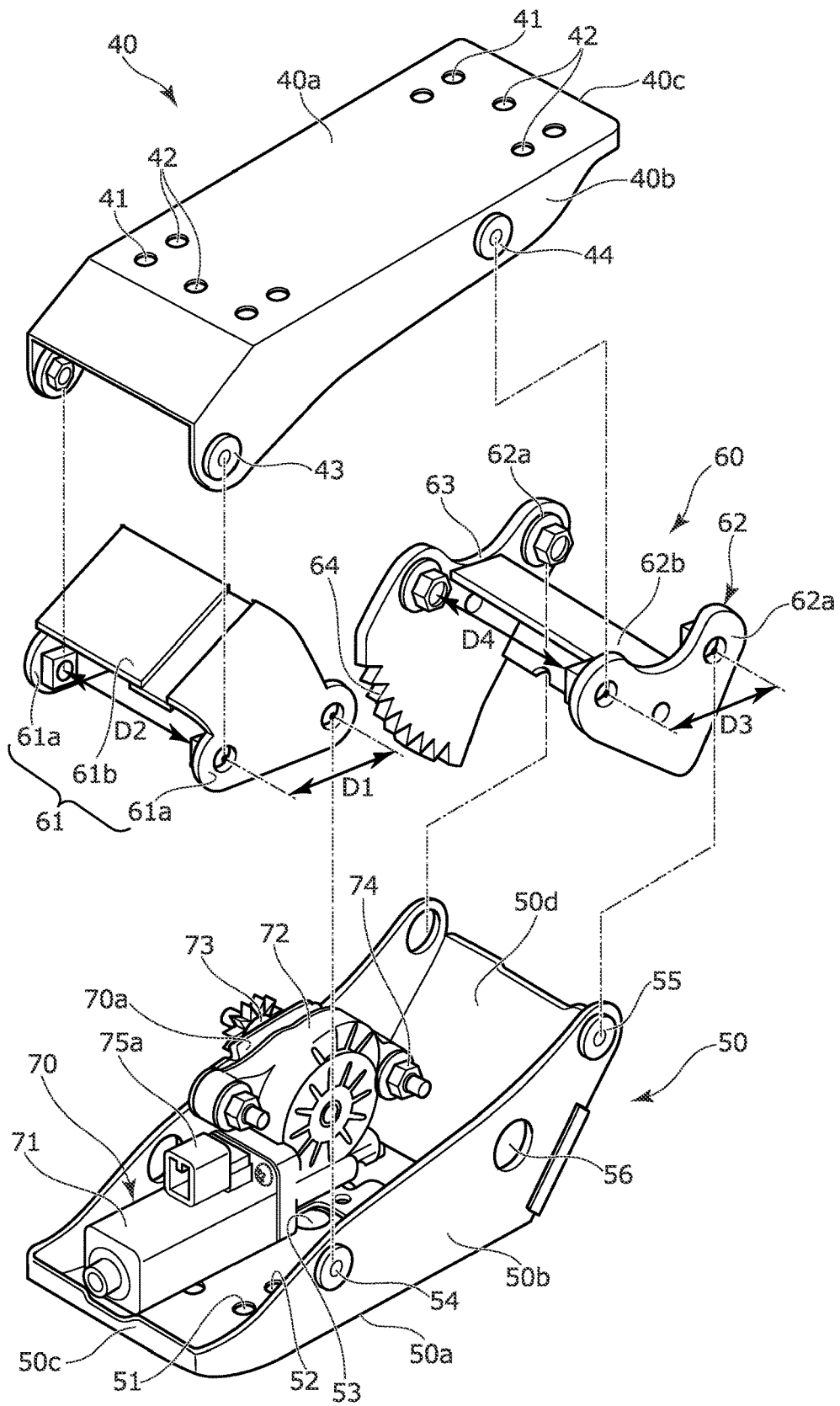
FIG. 4 is an exploded perspective view of the seat height adjustment unit and is a diagram showing a rotation link.

As shown in FIGS. 2 to 4, the seat height adjustment unit 10 is a unit capable of moving the seat 1 between the normal position and the upper position in which the seat is moved above the normal position and mainly includes the seat support plate 20 which supports the seat 1 from below, a chassis attachment plate 30 which is attached onto the chassis B, an upper link support member 40 that is attached to the seat support plate 20 between the seat support plate 20 and the chassis attachment plate 30 in the up to down direction, a lower link support member 50 that is attached to the chassis attachment plate 30, a rotation link 60 which connects the upper link support member 40 and the lower link support member 50, a motor device 70 which rotates the rotation link 60, and an ECU 80 which controls the motor device 70.

Figure 7:
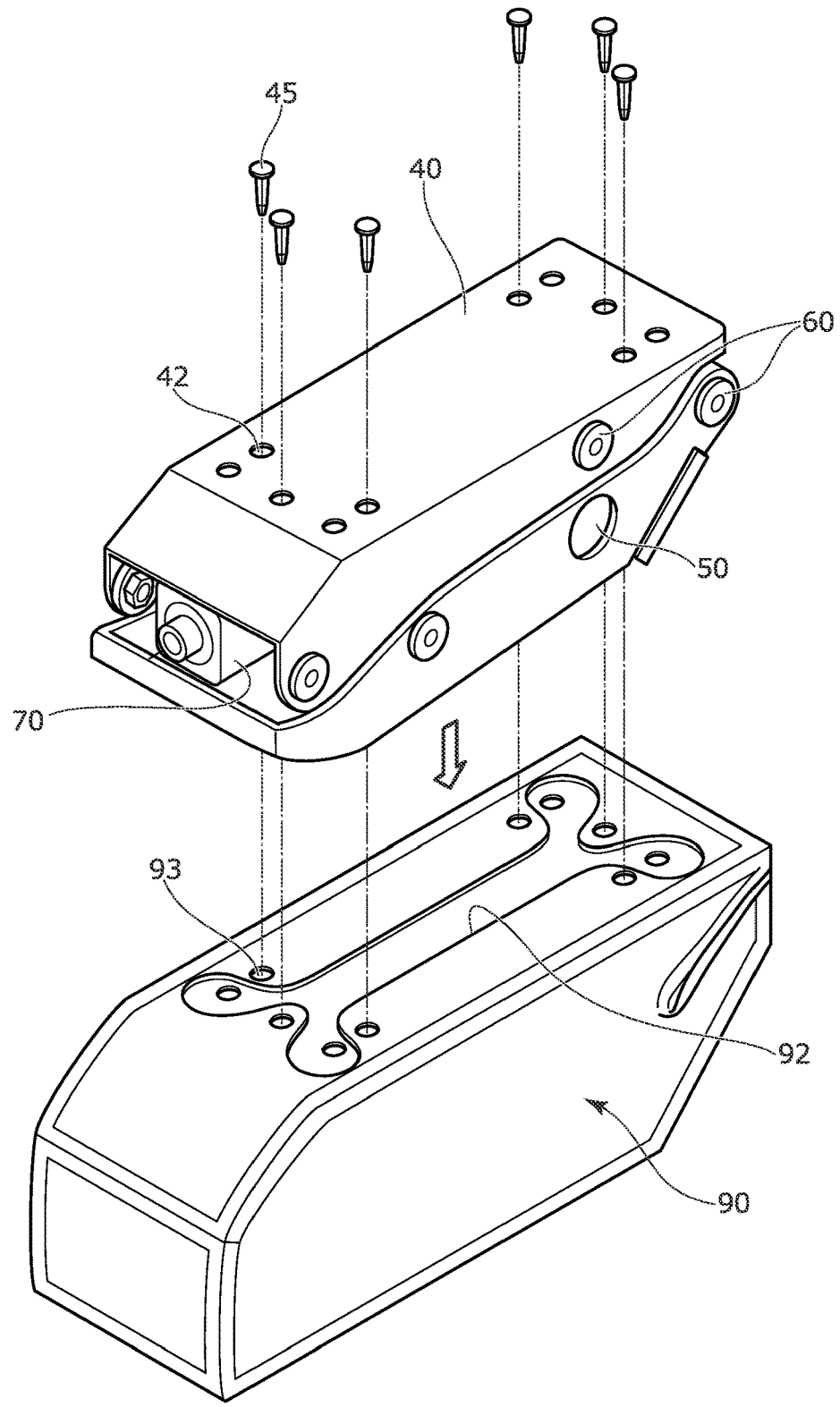
FIG. 7 is a diagram showing a cover member of the seat height adjustment unit.

Further, as shown in FIG. 7, the seat height adjustment unit 10 further includes a flexible cover member 90 that covers the upper link support member 40, the lower link support member 50, the rotation link 60, and the motor device 70 from the outside.

The seat support plate 20 is a metal plate-shaped plate made of a substantially T-shaped body and mainly includes a front plate portion 20a and a rear plate portion 20b which are integrally attached to the bottom surface of the seat 1 (the bottom plate 1a) and a center plate portion 20c which is disposed between the front plate portion 20a and the rear plate portion 20b and is integrally attached onto the upper link support member 40.

The center plate portion 20c is a portion located directly below the buttocks of the occupant when the occupant sits on the seat 1 and corresponds to a portion that receives a sitting load from the occupant.

The upper surface of the center plate portion 20c is provided with a plurality of attachment holes 21 which are used to attach the upper link support member 40 and a relief protrusion 22 which is provided at a position different from the attachment hole 21 to project upward and suppress the interference with a clip member 45 to be described later.

The attachment hole 21 is a substantially circular through hole and is formed at two positions with a gap therebetween in the width direction of the seat at the front portion and the rear portion of the center plate portion 20c so that the attachment holes are formed at four positions in total.

The relief protrusion 22 is a substantially circular projection and is formed at each position adjacent to the attachment hole 21 so that the relief protrusions are formed at six positions in total to surround the attachment hole 21.

Additionally, a reinforced bead 23 which extends in the front to back direction of the seat is formed at the center portion of the center plate portion 20c in the front to back direction of the seat at two positions with a gap therebetween in the width direction of the seat.

As shown in FIGS. 2 and 3, the chassis attachment plate 30 is a member obtained by processing a metal plate-shaped plate into a substantially box shape and has a function for attaching the seat height adjustment unit 10 onto the chassis B and a function of holding the component of the seat height adjustment unit 10 so as to sandwich the component between the chassis attachment plate and the seat support plate 20.

Figure 8:
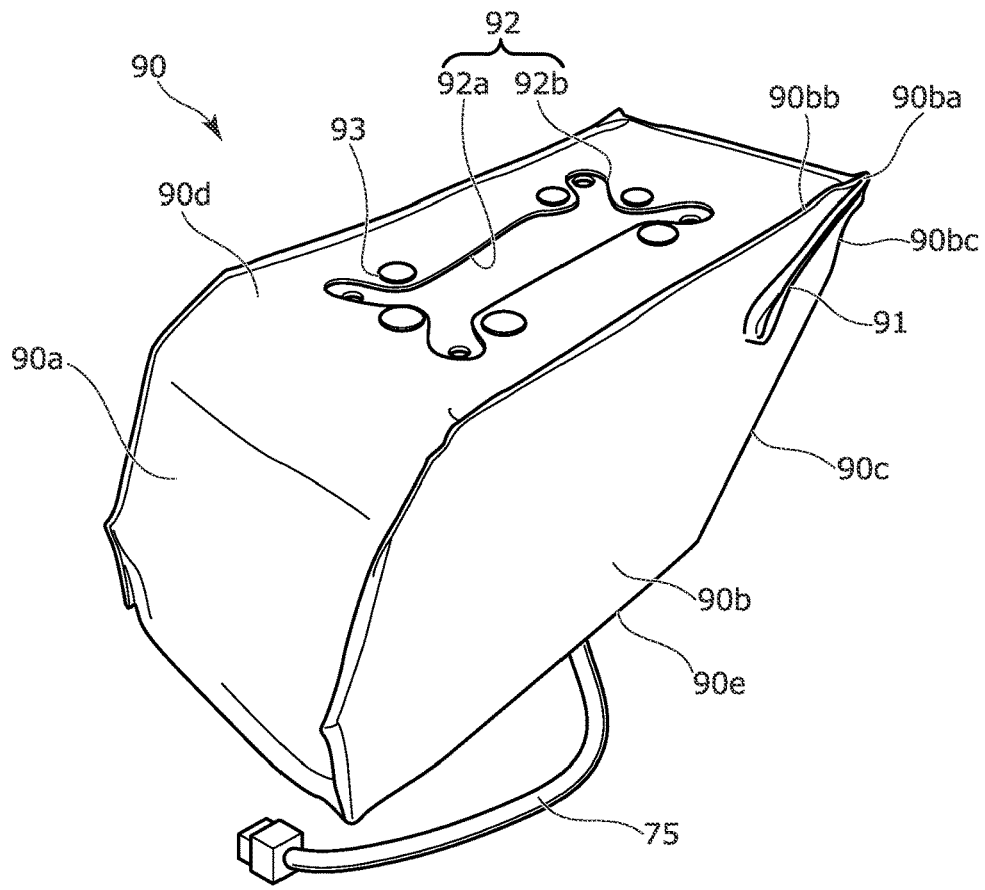
FIG. 8 is a perspective view showing a cover attached seat height adjustment unit.

A plurality of attachment holes 31 for attaching the lower link support member 50 are formed at a position corresponding to the attachment position of the rotation link 60 or the motor device 70 at the center portion in the width direction of the seat in the chassis attachment plate 30. Further, a harness passage hole 32 through which a harness 75 shown in FIG. 8 is inserted is formed at a position different from the attachment hole 31.

The attachment hole 31 is a substantially circular through hole and is formed at four positions in total at intervals in the front to back direction of the seat and the width direction of the seat.

Additionally, a plurality of relief protrusions (not shown) for suppressing the interference with a clip member (not shown) are formed at positions adjacent to the attachment hole 31 in the chassis attachment plate 30 to project downward.

As shown in FIGS. 3 and 4, the upper link support member 40 is a metal plate-shaped member having a substantially inverted U-shape in a vertical cross-section and is disposed to cover the rotation link 60 and the motor device 70 from above and side.

The upper link support member 40 mainly includes an upper wall portion 40a which extends in the front to back direction of the seat, right and left side wall portions 40b which respectively continuously extend from both end portions of the upper wall portion 40a in the width direction of the seat, and a rear wall portion 40c which continuously extends downward from the rear end portion of the upper wall portion 40a and is connected to the right and left side wall portions 40b.

An attachment hole 41 is formed at a position corresponding to each attachment hole 21 in the upper wall portion 40a to be attached to the seat support plate 20.

Further, as shown in FIG. 8, a plurality of cover attachment holes 42 for attaching the cover member 90 are formed at positions different from the attachment hole 41 in the upper wall portion 40a.

The cover attachment hole 42 is a substantially circular through hole, is formed at each position adjacent to the attachment hole 41, and is formed at six positions in total to surround each attachment hole 21.

An upper end portion of a front link 61 is attached to the front portion of the side wall portion 40b to be rotatable through the upper link rotation shaft 43.

Further, an upper end portion of a rear link 62 is attached to the rear portion of the side wall portion 40b to be rotatable through the upper link rotation shaft 44.

In the above-described configuration, as shown in FIGS. 3 and 4, each cover attachment hole 42 is disposed at a position facing each relief protrusion 22 of the seat support plate 20 in the up to down direction.

Therefore, as shown in FIG. 7, when the clip member 45 is attached to the cover attachment hole 42, the head portion of the clip member 45 does not interfere with the seat support plate 20 and each component can be compactly disposed.

As shown in FIGS. 3 and 4, the lower link support member 50 is a member obtained by processing a metal plate-shaped plate into a substantially box shape and is accommodated and disposed to cover the rotation link 60 and the motor device 70 from below and side.

The lower link support member 50 mainly includes a bottom wall portion 50a which extends in the front to back direction of the seat, right and left side wall portions 50b which continuously extend upward from both end portions of the bottom wall portion 50a in the width direction of the seat, and a front wall portion 50c and a rear wall portion 50d which respectively continuously extend upward from both end portions of the bottom wall portion 50a in the front to back direction of the seat.

A plurality of attachment holes 51 for attachment to the chassis attachment plate 30 and a plurality of cover attachment holes 52 for attaching the cover member 90 at a position different from the attachment hole 51 are formed in the bottom wall portion 50a.

Figure 9:
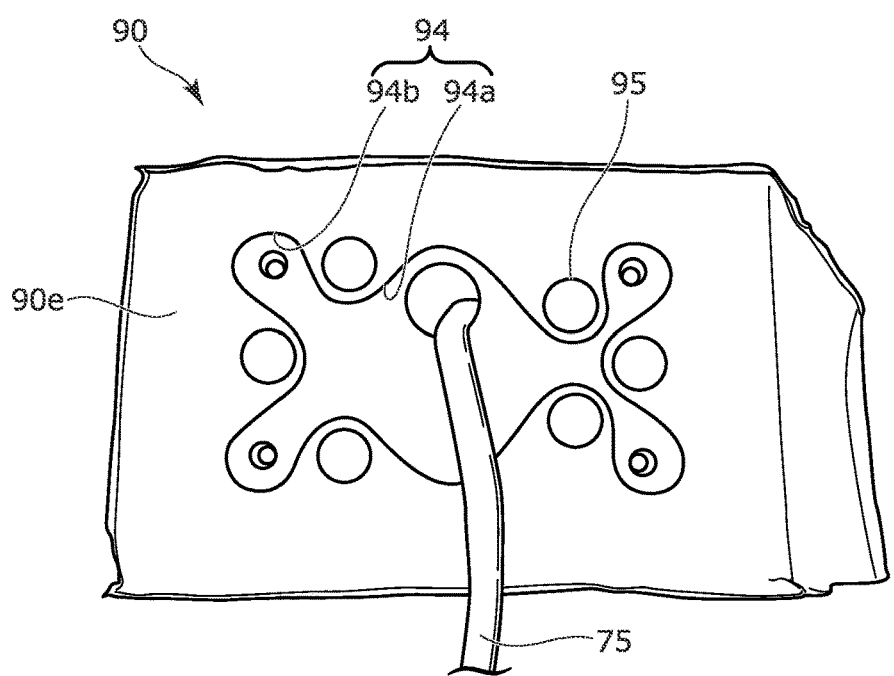
FIG. 9 is a bottom view of the cover attached seat height adjustment unit.

Further, a motor attachment bracket 70a for attaching the motor device 70 is attached to the upper surface of the bottom wall portion 50a and a harness passage hole 53 through which the harness 75 shown in FIGS. 7 to 9 is further formed at a position different from the attachment portion of the motor device 70 in the bottom wall portion 50a.

The lower end portion of the front link 61 is attached to the front portion of the side wall portion 50b to be rotatable through the lower link rotation shaft 54.

Further, the lower end portion of the rear link 62 is attached to the rear portion of the side wall portion 50b to be rotatable through the lower link rotation shaft 55.

A confirmation hole 56 for confirming the assembly state of the rotation link 60 and the motor device 70 is formed at a portion between the lower link rotation shafts 54 and 55 in the side wall portion 50b.

As shown in FIG. 3 to FIGS. 5A and 5B, the rotation link 60 is a member that rotates so that the upper link support member 40 located on the side of the seat 1 is moved in the up to down direction with respect to the lower link support member 50 located on the side of the chassis B in order to adjust the height position of the seat 1.

Figure 5A:
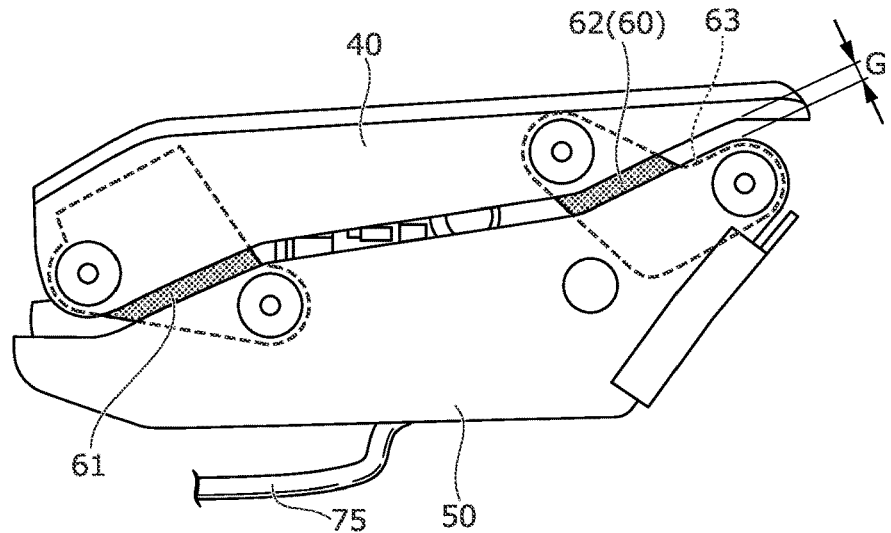
FIG. 5A is a side view when the seat height adjustment unit is located at a normal position.
Figure 5B:
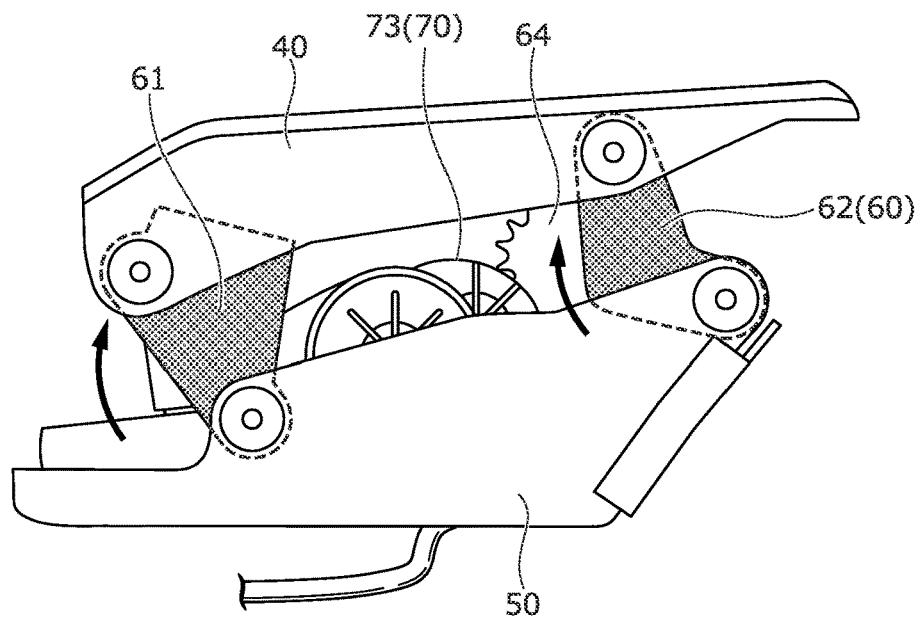
FIG. 5B is a side view when the seat height adjustment unit is located at an upper position.

The rotation link 60 includes the front link 61 and the rear link 62 which are arranged at different positions in the front to back direction of the seat and the rear link 62 is used as the drive link and is configured to rotate between the normal position shown in FIG. 5A and the upper position shown in FIG. 5B.

Specifically, a sector gear portion 64 which is a gear is formed in a part of the outer peripheral portion of the rear link 62 and meshes with a pinion gear 73 provided to protrude outward from the lateral portion of the motor device 70.

When the motor device 70 is operated, the pinion gear 73 rotates in accordance with the rotation of the motor body 71 and the meshing position between the pinion gear 73 and the sector gear portion 64 changes. Then, the rear link 62 provided with the sector gear portion 64 rotates, so that the rear link 62 rotates and the front link 61 also rotates. As a result, the seat 1 moves up and down and the seat height is adjusted.

As shown in FIG. 4, the front link 61 includes right and left link portions 61a which are arranged with a gap therebetween in the width direction of the seat and a link connection portion 61b which connects the upper end portions of the right and left link portions 61a.

The link portion 61a is made of a substantially elliptical plate member elongated in the front to back direction of the seat, the front end portion is rotatably attached to the upper link support member 40, and the rear portion is attached to the lower link support member 50.

The link connection portion 61b has a shape that is inclined upward from the front end portion to the rear end portion of the link portion 61a in order to avoid the interference with the motor device 70.

The rear link 62 has a shape different from the front link 61 and includes right and left link portions 62a and a link connection portion 62b which connects the center portions of the right and left link portions 62a.

The link portion 62a is made of a plate member having a substantially V-shape (substantially boomerang shape) that is elongated in the front to back direction of the seat, the front end portion is rotatably attached to the upper link support member 40, and the rear portion is attached to the lower link support member 50.

The outer peripheral portions of the upper ends of the right and left link portions 62a are provided with a link curved portion 63 which is curved downward.

Further, the right and left link portions 62a have different shapes from each other and the sector gear portion 64 is formed in the outer peripheral portion of the front end of one link portion 62a in the right and left link portions 62a. The sector gear portion 64 meshes with the pinion gear 73.

In the above-described configuration, the rotation link 60 rotates between the normal position shown in FIG. 5A and the upper position shown in FIG. 5B.

When the rotation link 60 is located at the normal position shown in FIG. 5A, a gap G is formed between the upper link support member and the lower link support member in the up to down direction when viewed from the seat side.

Therefore, foreign matter will not be pinched by the upper link support member 40 and the lower link support member 50 or the hands of the assembling worker will not be pinched by mistake.

Further, when the rotation link 60 is located at the normal position shown in FIG. 5A, the outer peripheral portion (the upper end portion) of the link curved portion 63 of the rear link 62 and the outer peripheral portion (the upper end portion) of the lower link support member 50 are arranged at the overlapping position when viewed from the seat side.

Therefore, foreign matter or the like is not pinched by the upper link support member 40 and the rotation link 60 (the rear link 62).

Further, in the above-described configuration, as shown in FIG. 4, a distance (linear distance) D1 between the upper link rotation shaft 43 and the lower link rotation shaft 54 in the front to back direction of the seat in the link portion 61a of the front link 61 is equal to a distance D3 between the upper link rotation shaft 44 and the lower link rotation shaft 55 in the front to back direction of the seat in the link portion 62a of the rear link 62.

Further, a distance (the linear distance) D2 between the right and left link portions 61a of the front link 61 in the width direction of the seat is equal to a distance D4 between the right and left link portions 62a of the rear link 62 in the width direction of the seat.

Therefore, the rotation link 60 is smoothly operated.

Additionally, the distance D1 and the distance D2 may be different from each other and the distance D3 and the distance D4 may be different from each other.

As shown in FIG. 4, the motor device 70 is a drive device for rotating the rotation link 60 and is attached to the lower link support member 50 through the motor attachment bracket 70a to be located at the horizontal position.

The motor device 70 mainly includes a motor body 71 which is elongated in the front to back direction of the seat, a transmission member 72 that is attached to the rear end portion of the motor body 71 and transmits the rotation energy of the motor body 71, the pinion gear 73 which rotates in accordance with the rotation of the transmission member 72, and a connecting rod 74 which connects the transmission member 72 and the motor attachment bracket 70a.

Further, as shown in FIG. 5A, the motor device 70 further includes the harness 75 which connects the motor body 71 and the ECU 80.

The upper end portion of the motor body 71 is provided with a harness connection portion 71a for connecting one end portion of the harness 75 and the harness 75 connected to the harness connection portion 71a passes through the harness passage hole formed in the lower link support member 50, extends downward, and is connected to the ECU 80 and the battery (not shown) provided at a predetermined position of the chassis B.

Additionally, the battery is a power storage device for supplying electric power to the motor body 71.

Figure 6:
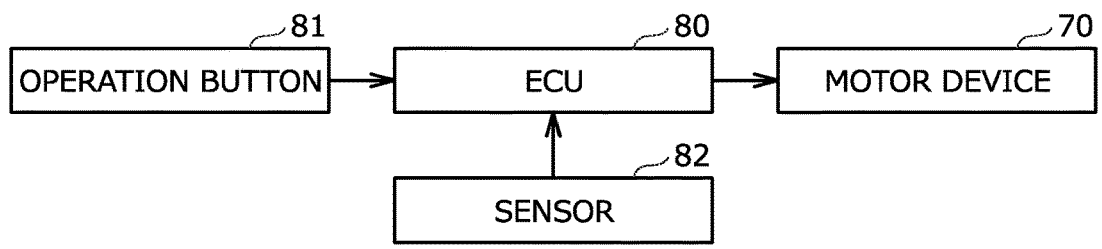
FIG. 6 is a block diagram showing a control mechanism of the seat height adjustment unit.

As shown in FIG. 6, the ECU 80 is an electronic control unit which controls the motor device 70, controls the motor device 70 in accordance with the operation of an operation button 81 by the occupant, and transmits a signal for driving the motor device 70 to the motor device 70 when a predetermined condition is satisfied.

In the above-described configuration, the ECU 80 controls the motor device 70 in accordance with the traveling speed of the motorcycle. Accordingly, the rotation direction and the rotation amount of the rotation link 60 are controlled and the height position of the seat 1 is adjusted to a position according to the traveling speed.

Specifically, the ECU 80 includes a sensor 82 for detecting the traveling speed of the motorcycle and monitors the traveling speed. That is, the sensor 82 is a sensor that outputs a signal according to the detection result when detecting the traveling speed and the ECU 80 specifies the traveling speed by receiving an output signal from the sensor 82.

After the traveling speed is specified, the ECU 80 compares the specified traveling speed with a predetermined threshold value stored in advance and determines whether or not to adjust the height of the seat 1.

There are two types of predetermined threshold values, one is a "traveling threshold value" for determining whether or not to move the seat 1 from the normal position to the upper position, and the other is a "decelerating threshold value" for determining whether or not to move the seat 1 from the upper position to the normal position.

For example, when the specified traveling speed becomes equal to or larger than the "traveling threshold value", the ECU 80 controls the motor device 70 so that the seat 1 moves upward. Then, when the specified traveling speed becomes equal to or smaller than the "decelerating threshold value", the ECU 80 controls the motor device 70 so that the seat 1 moves downward.

As shown in FIG. 7 to FIGS. 11A and 11B, the cover member 90 is a flexible leather cover (synthetic leather cover) which has a bag shape and is configured to enclose the upper link support member 40, the lower link support member 50, the rotation link 60, and the motor device 70.

As the resin material of the cover member 90, polyvinyl chloride leather (PVC leather) is particularly preferable.

The cover member 90 is formed as a substantially hexahedron formed by joining terminals of a plurality of seat materials and a portion formed by joining the terminals of the seat materials is located on the ridge of the cover member.

Additionally, as a joining method of joining the terminals of the seat materials, it is preferable to use a method of welding (welder welding) after overlapping the terminals of the seat materials with each other, but the general joining method such as sewing or adhesion may be used without particular limitation.

Figure 10A:
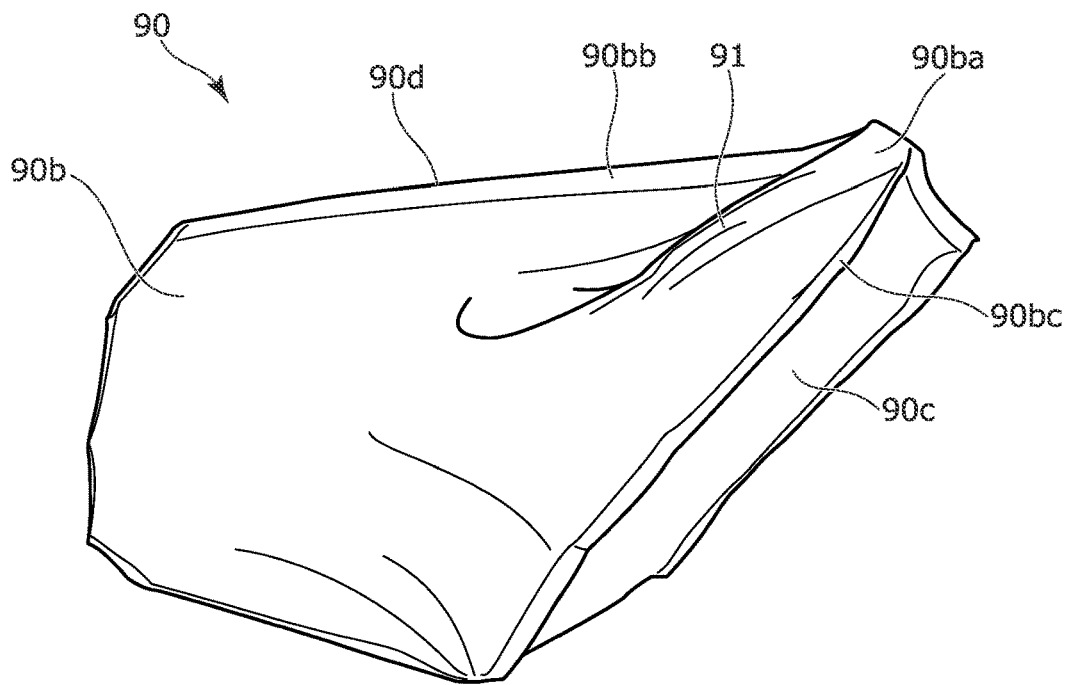
FIG. 10A is a perspective view when the cover attached seat height adjustment unit located at the upper position is viewed from the diagonally rear side.
Figure 10B:
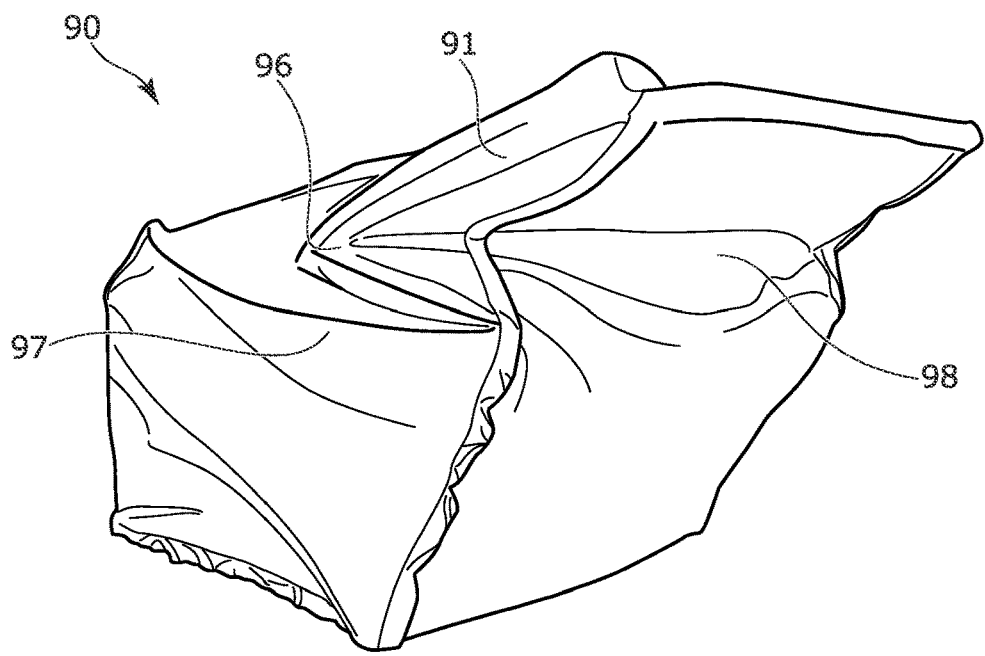
FIG. 10B is a perspective view when the cover attached seat height adjustment unit located at the normal position is viewed from the diagonally rear side.

The cover member 90 is configured to be folded from FIG. 10A to FIG. 10B when the shape of the cover member changes in accordance with the movement operation of the seat 1 (the rotation link 60) and the seat 1 (the rotation link 60) moves from the upper position to the normal position.

The cover overhanging portion 91 is formed so that a lateral portion corresponding to the rotation link 60 (the rear link 62) in the cover member 90 projects outward when the cover member 90 is folded.

As shown in FIGS. 8 and 10A, the cover overhanging portion 91 is formed by bending a part of the lateral portion 90b of the cover member 90 outward and is disposed at a peripheral position of a corner portion 90ba located at a position closest to the rear link 62 in a plurality of corner portions of the lateral portion 90b of the cover member 90.

Specifically, the cover overhanging portion 91 is formed by welding the bent portion and is disposed between two ridges 90bb and 90bc defining the corner portion 90ba in the lateral portion 90b of the cover member 90.

More specifically, the cover overhanging portion 91 extends along the center line between two ridges 90bb and 90bc defining the corner portion 90ba while starting from the corner portion 90ba located at a position closest to the rear link 62 serving as the drive link in the lateral portion 90b of the cover member 90.

As shown in FIG. 8, the upper surface (the upper portion 90d) of the cover member 90 is provided with an upper opening hole 92 for taking in and out the component of the seat height adjustment unit 10 and an upper cover attachment portion 93 provided at a position different from the upper opening hole 92 and used for the attachment to the upper link support member 40.

The upper opening hole 92 includes a center hole portion 92a which is provided at the center portion of the upper surface of the cover member 90 and is elongated in the front to back direction of the seat and a plurality of slit hole portions 92b which radially extend from both end portions of the center hole portion 92a in the longitudinal direction and have a slit shape.

The upper cover attachment portion 93 is a substantially circular through hole and is disposed between the slit hole portions 92b arranged adjacent to each other in the cover member 90.

Further, the upper cover attachment portion 93 is disposed at a position facing the cover attachment hole 42 in the upper surface of the upper link support member 40 and is formed at six positions in total.

In the above-described configuration, the cover member 90 is attached to the upper link support member 40 by fastening the clip member 45 from above while the upper cover attachment portion 93 and the cover attachment hole 42 communicate with each other.

Additionally, since each clip member 45 is fastened to form a triangular shape in each of the front portion and the rear portion of the seat, the clip member can be fastened relatively firmly.

As shown in FIG. 9, the bottom surface (the lower portion 90e) of the cover member 90 is provided with a lower opening hole 94 used for taking in and out the component of the seat height adjustment unit 10 and passing the harness 75 therethrough and a lower cover attachment portion 95 provided at a position different from the lower opening hole 94 and used for the attachment to the lower link support member 50.

The lower opening hole 94 includes a substantially rectangular center hole portion 94a which is provided at the center portion of the bottom surface of the cover member 90 and a plurality of slit hole portions 94b which radially extend from both end portions of the center hole portion 94a in the front to back direction of the seat and has a slit shape.

The lower cover attachment portion 95 is a substantially circular through hole and is disposed between the slit hole portions 94b arranged adjacent to each other in the cover member 90.

Further, the lower cover attachment portion 95 is disposed at a position facing the cover attachment hole 52 in the bottom surface of the lower link support member 50 and is formed at six positions in total.

In the above-described configuration, the cover member 90 is attached to the lower link support member 50 by fastening the clip member 57 from below while the lower cover attachment portion 95 and the cover attachment hole 52 communicate with each other.

Further, in the above-described configuration, the lower opening hole 94 and the harness passage hole 53 communicate with each other. Therefore, the other end portion of the harness of which one end portion is connected to the motor device 70 extends to be exposed from the cover member 90 and can be connected to the ECU 80 provided on the chassis B.

In the above-described configuration, as shown in FIG. 7, a method of taking the component of the seat height adjustment unit 10 into the cover member 90 is as below.

First, the component obtained by integrating the upper link support member 40, the lower link support member 50, the rotation link 60, and the motor device 70 is compactly disposed at the normal position and in this state, the component is inserted into the cover member 90. Specifically, the component is inserted into the cover member 90 by using the upper opening hole 92 of the cover member 90.

At this time, the harness 75 passes through the lower opening hole 94 of the cover member 90 from the component to be exposed to the outside.

Then, after the component inserted into the cover member 90 is once deployed from the normal position to the upper position, the upper cover attachment portion 93 located on the upper surface of the cover member 90 and the cover attachment hole 42 of the upper link support member 40 are vertically overlapped with each other and are fastened by the clip member 45.

Similarly, the lower cover attachment portion 95 located on the bottom surface of the cover member 90 and the cover attachment hole 52 of the lower link support member 50 are vertically overlapped with each other and are fastened by the clip member 57.

Then, the seat support plate 20 is further attached to the upper surface of the component attached with the cover member 90 and the chassis attachment plate 30 is attached to the bottom surface of the component.

According to the above-described attachment method, the seat height adjustment unit 10 attached with the cover member 90 is completed.

Further, in the above-described configuration, the cover member 90 is configured to be folded from FIG. 10A to FIG. 10B when the seat 1 moves downward from the upper position to the normal position.

When the cover member 90 is folded, the upper portion (the upper end portion) of the lateral portion 90b in the cover member 90 is provided with a lateral protrusion 96 which protrudes outward in the width direction of the seat.

The lateral protrusion 96 is a bulging portion formed toward the front side of the seat while starting from the cover overhanging portion 91.

Further, when the cover member 90 is folded, a lateral concave portion 97 which is recessed inward in the width direction of the seat is formed at the center portion of the lateral portion 90b.

The lateral concave portion 97 is a recess portion which is located directly below the lateral protrusion 96 and is formed to extend in the front to back direction of the seat.

Since the lateral protrusion 96 and the lateral concave portion 97 are formed, it is possible to absorb stress applied to the folded cover member 90 in a well-balanced manner.

Further, in the above-described configuration, as shown in FIGS. 10A and 10B, when the cover member 90 is folded, a rear concave portion 98 which is recessed inward in the front to back direction of the seat is formed at the upper portion (the upper end portion) of the rear portion 90c in the cover member 90.

The rear concave portion 98 is a recess portion which is formed to extend in the width direction of the seat. Since the rear concave portion 98 is formed, it is possible to absorb stress applied to the folded cover member 90 in a well-balanced manner. Further, the corner portion 90ba of the cover member 90 can be compactly folded.

Additionally, the corner portion 90ba of the cover member 90 is preferably formed to have an acute angle (60° or less) when viewed from the seat side. Then, the corner portion 90ba of the cover member 90 can be further compactly folded.

Additionally, the corner portion 90ba is a corner portion which is located in a direction in which the folded cover member 90 is deployed (diagonally rearward on the seat) among a plurality of corner portions in the lateral portion 90b of the cover member 90.

Further, in the above-described configuration, as shown in FIG. 10A, the uppermost surface (uppermost end) of the upper portion 90d in the cover member 90 is disposed at a position higher than the uppermost end (ridge) of the rear portion 90c when the cover member 90 is deployed.

Then, since it is possible to suppress the occurrence of wrinkles and slack in the peripheral portion of the connection portion of the upper portion 90d and the rear portion 90c in the cover member 90 and to suppress the interference between the cover member 90 and the rotation link 60 (the rear link 62), it is possible to smoothly operate the rotation link 60.

Figure 11A:
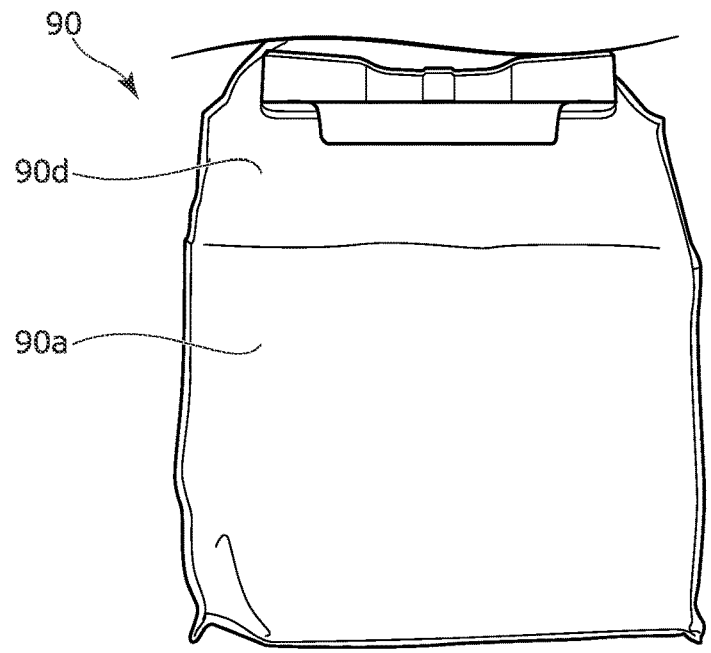
FIG. 11A is a perspective view when the cover attached seat height adjustment unit located at the upper position is viewed from the front side.
Figure 11B:
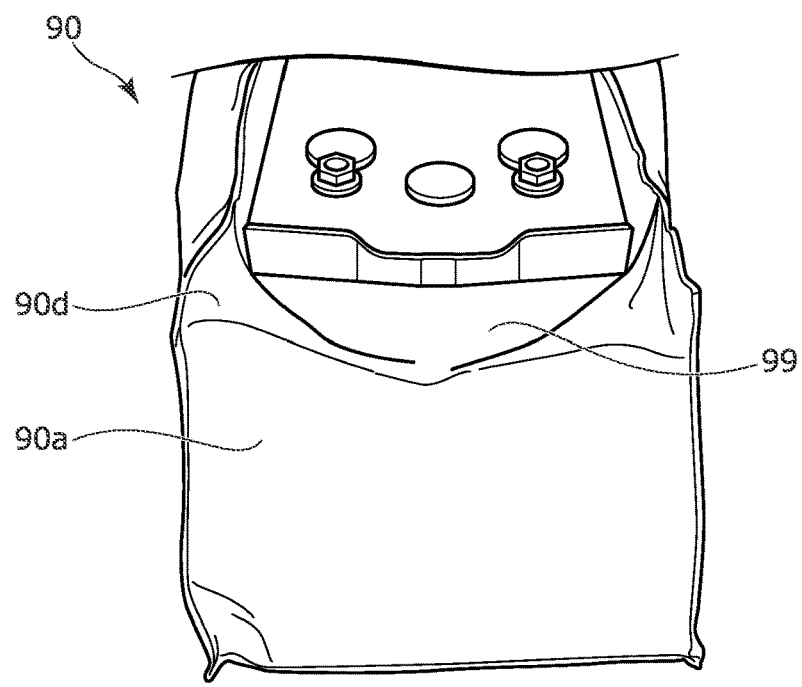
FIG. 11B is a perspective view when the cover attached seat height adjustment unit located at the normal position is viewed from the front side.

Further, in the above-described configuration, as shown in FIGS. 11A and 11B, when the cover member 90 is folded, a front concave portion 99 which is recessed downward is formed at the connection portion of the front portion 90a and the upper portion 90d in the cover member 90.

The front concave portion 99 is a recess portion which is formed at the center portion in the width direction of the seat. Since the front concave portion 99 is formed, it is possible to absorb stress applied to the folded cover member 90 in a well-balanced manner.

Second Embodiment of Seat Height Adjustment Unit

Figure 12:
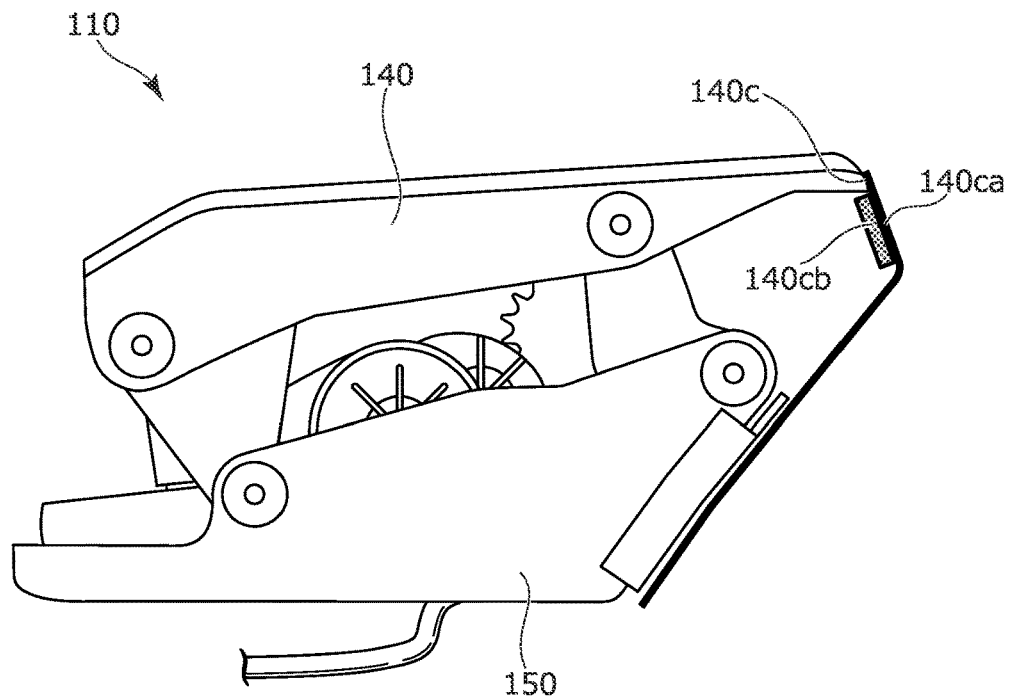
FIG. 12 is a side view showing a seat height adjustment unit of a second embodiment.

Next, a seat height adjustment unit 110 of a second embodiment will be described with reference to FIG. 12. In the following description, the description of the contents overlapping with the seat height adjustment unit 10 will be omitted.

The seat height adjustment unit 110 is mainly different from the seat height adjustment unit 10 in that an auxiliary cover 140ca and a holding plate 140cb are attached to a lower end portion of a rear wall portion 140c of an upper link support member 140.

The auxiliary cover 140ca is a flexible leather cover which extends to hang down from the lower end portion of the rear wall portion 140c and covers the rotation link 60 and the motor device 70 from the rear side.

Specifically, the auxiliary cover 140ca includes a first extension portion which extends downward along a wall surface of the rear wall portion 140c and a second extension portion which continuously extends downward along a wall surface of a rear wall portion 150d of a lower link support member 150 from the first extension portion.

The holding plate 140cb is a plate made of a resin material that is elongated in the width direction of the seat, is attached to the front surface of the first extension portion of the auxiliary cover 140ca, and has a function of maintaining the shape of the auxiliary cover 140ca.

Additionally, the holding plate 140cb is disposed at a position facing the rotation link 60 (the rear link 62) when the seat 1 moves downward from the upper position to the normal position.

With the above-described configuration, the auxiliary cover 140ca serves as a wall so that the rear portion 90c of the cover member 90 is not folded inward when the cover member 90 is folded.

Therefore, the rotation link 60 can be smoothly operated without interfering with the cover member 90.

Third Embodiment of Seat Height Adjustment Unit

Figure 13:
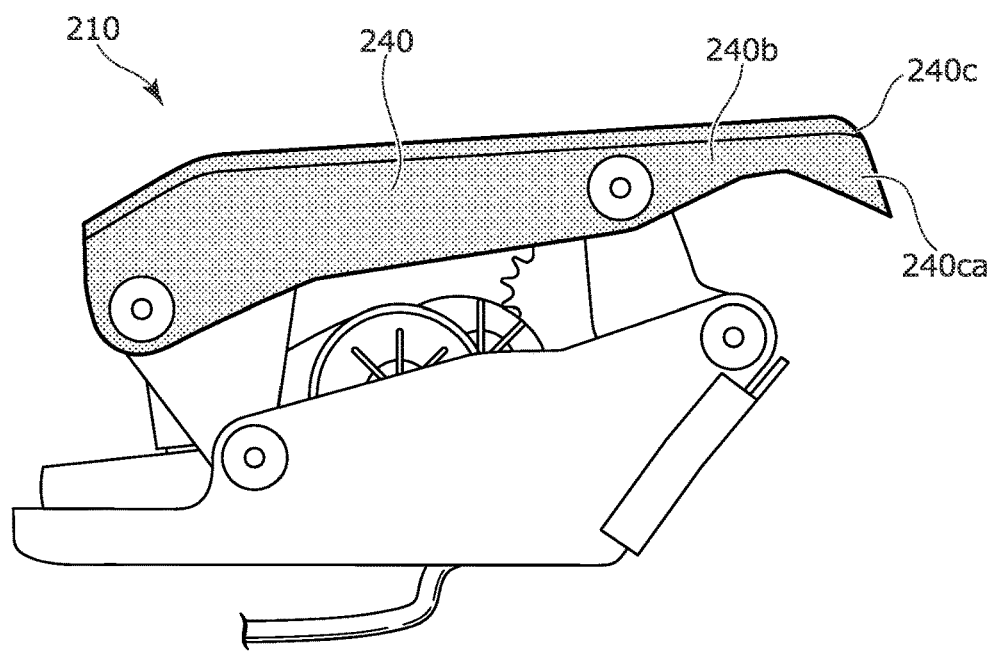
FIG. 13 is a side view showing a seat height adjustment unit of a third embodiment.

Next, a seat height adjustment unit 210 of a third embodiment will be described with reference to FIG. 13.

The seat height adjustment unit 210 is mainly different from the seat height adjustment unit 10 in that a rear end portion of an upper link support member 240 is provided with an extension wall portion 240ca by extending a side wall portion 240b and a rear wall portion 240c downward.

The extension wall portion 240ca is a wall portion which continuously extends downward from the lower end portions of the side wall portion 240b and the rear wall portion 240c and covers a part of the rotation link 60 and the motor device 70 from the rear side.

Even in the above-described configuration, the extension wall portion 240ca serves as a wall so that the rear portion 90c of the cover member 90 is not folded inward when the cover member 90 is folded.

Therefore, the rotation link 60 can be smoothly operated without interfering with the cover member 90.

Fourth Embodiment of Seat Height Adjustment Unit

Next, a seat device S4 and a seat height adjustment unit 310 of a fourth embodiment will be described with reference to FIGS. 14 to 17.

The seat device S4 realizes a conveyance seat device capable of efficiently suppressing the vibration from being transmitted from the chassis B4 to the seat height adjustment unit 310 and appropriately protecting the component of the seat height adjustment unit 310.

The seat device S4 is mainly different from the seat device S in that a vibration suppressing unit 390 for suppressing the vibration transmitted to the seat height adjustment unit 310 is provided.

Figure 14:
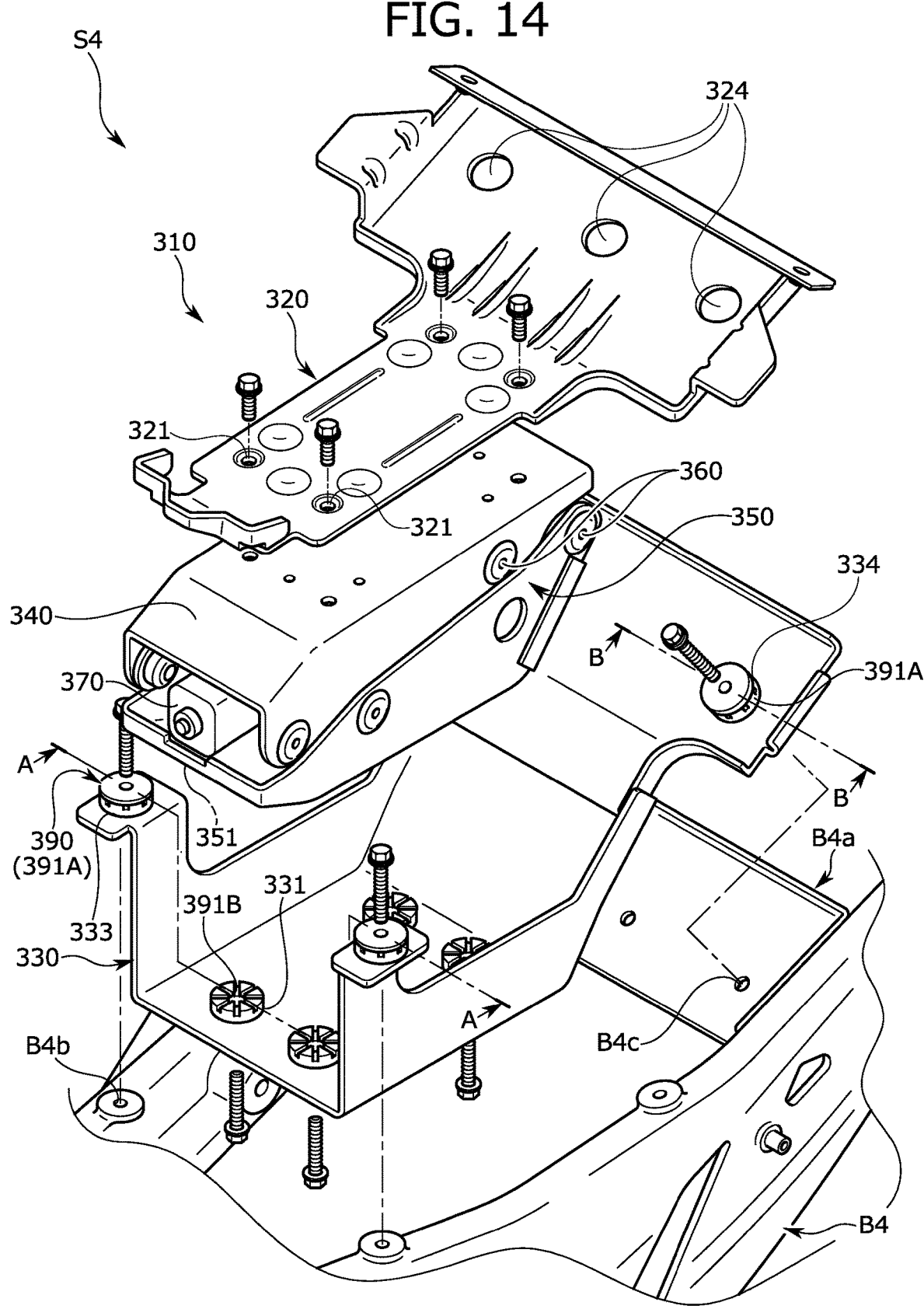
FIG. 14 is an exploded perspective view of a seat height adjustment unit and a chassis of a fourth embodiment.

As shown in FIGS. 1 and 14, the seat device S4 is a conveyance seat device including a seat 301, the seat height adjustment unit 310, and the vibration suppressing unit 390 and is set and attached onto the chassis B4.

The vibration suppressing unit 390 is attached into the chassis B and is disposed between the seat height adjustment unit 310 and the chassis B4 in the up to down direction.

As shown in FIG. 14, the seat height adjustment unit 310 mainly includes a seat support plate 320, a chassis attachment plate 330, an upper link support member 340, a lower link support member 350, a rotation link 360, a motor device 370, an ECU 380, and a cover member (not shown).

Additionally, the seat device S4 may not essentially include the above-described cover member.

The upper surface of the seat support plate 320 is provided with a plurality of attachment holes 321 for attaching the upper link support member 340 and a plurality of relief holes 324 for suppressing the interference with a vibration suppressing member 391 to be described later.

The relief holes 324 are substantially circular through holes and are arranged at predetermined intervals in the width direction of the seat.

The upper surface of the chassis attachment plate 330 is provided with a plurality of attachment holes 331 for attaching the lower link support member 350, a plurality of chassis assembly holes 333 used for the attachment onto the chassis B4, and a plurality of second chassis assembly holes 334 used for the attachment onto the chassis auxiliary plate B4a provided in the chassis B4.

Figure 15A:
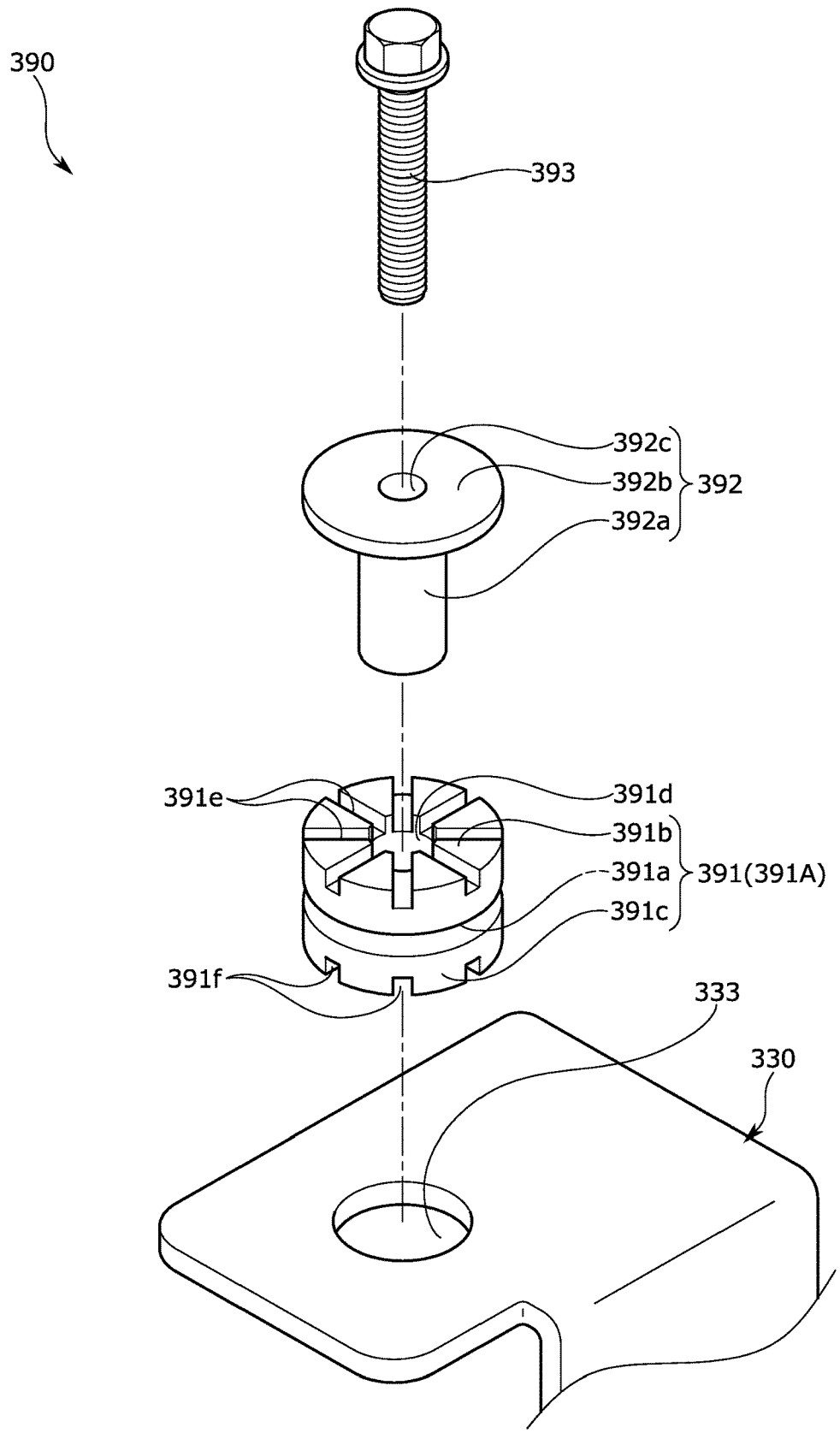
FIG. 15A is an exploded perspective view of an assembly bolt, a holding member, and a vibration suppressing member.
Figure 15B:
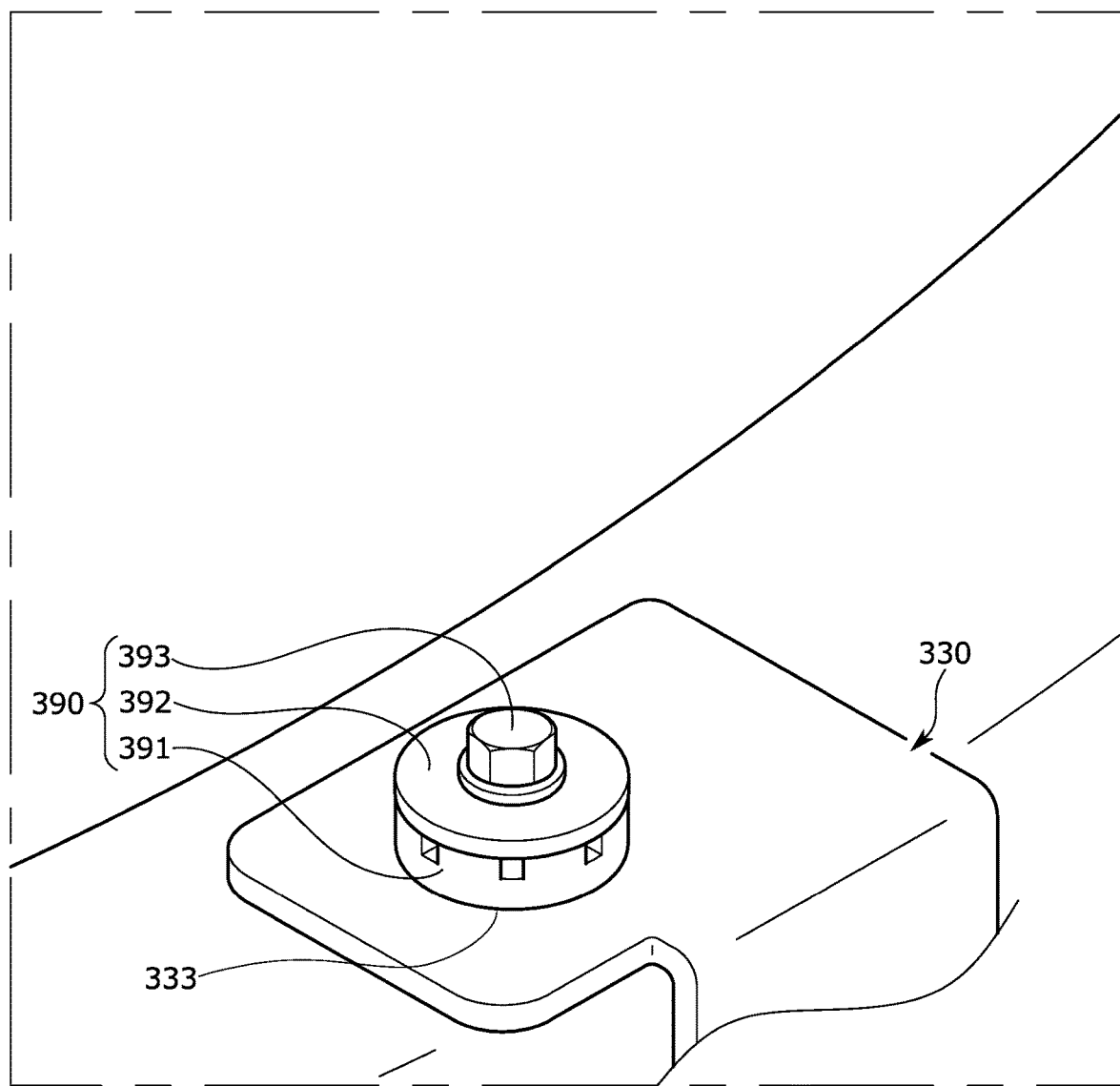
FIG. 15B is an assembly perspective view of FIG. 15A.

As shown in FIGS. 15A and 15B, the attachment hole 331, the chassis assembly hole 333, and the second chassis assembly hole 334 are respectively attached to the vibration suppressing member 391.

As shown in FIGS. 14 to 17, the vibration suppressing unit 390 is for suppressing the vibration transmitted from the chassis B4 to the seat height adjustment unit 310 (the motor device 370) and mainly includes an elastic vibration suppressing member 391 and a spacer 392 for holding the vibration suppressing member 391.

The vibration suppressing member 391 is a hollow elastic member and is fitted and attached to each of the attachment hole 331, the chassis assembly hole 333, and the second chassis assembly hole 334.

The vibration suppressing member 391 mainly includes a ring-shaped main body portion 391a and an upper flange portion 391b and a lower flange portion 391c which are respectively provided in the upper surface and the bottom surface of the main body portion 391a and are formed in a ring shape to have a width larger than that of the main body portion 391a.

The center portion of the vibration suppressing member 391 is provided with a through hole 391d which extends in the up to down direction and through which the spacer 392 penetrates.

Further, the upper surface of the upper flange portion 391b and the bottom surface of the lower flange portion 391c are respectively provided with a plurality of grooves 391e and 391f which radially extend from the through hole 391d in the radial direction. Therefore, the flexibility of the vibration suppressing member 391 is improved.

The spacer 392 is a cylindrical resin member, is used to position the vibration suppressing member 391 and maintains the shape of the vibration suppressing member 391, and is fitted to the vibration suppressing member 391 from above.

Specifically, the spacer 392 mainly includes a cylindrical spacer body 392a which is fitted to the through hole 391d of the vibration suppressing member 391 and a ring-shaped flange portion 392b which is provided on the upper surface of the spacer body 392a, is formed to have a width larger than that of the spacer body 392a, and comes into contact with the upper surface or the bottom surface of the vibration suppressing member 391.

The center portion of the spacer 392 is provided with a through hole 392c which extends in the up to down direction and through which an assembly bolt 393 penetrates.

In the above-described configuration, as shown in FIGS. 15A and 15B, the upper flange portion 391b and the lower flange portion 391c are arranged to sandwich the chassis attachment plate 330 in the up to down direction when the vibration suppressing member 391 is fitted to the chassis assembly hole 333.

Additionally, the vibration suppressing member 391 has the same configuration even when the vibration suppressing member is fitted to the attachment hole 331 and the second chassis assembly hole 334.

Therefore, it is possible to easily position the vibration suppressing member 391.

Figure 16:
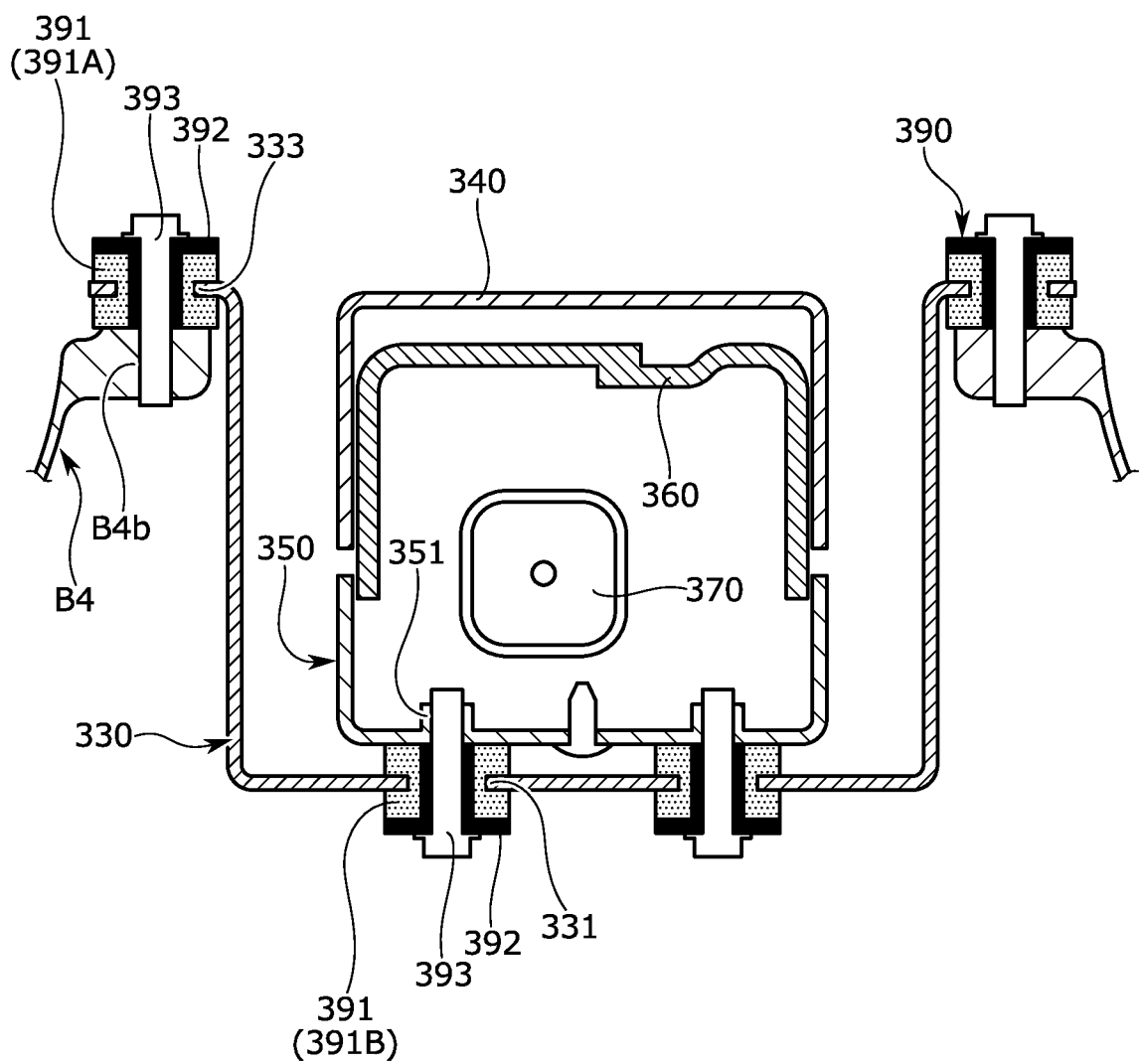
FIG. 16 is a cross-section A-A of FIG. 14 and a diagram showing an assembly structure of a vibration suppressing member.

Further, in the above-described configuration, as shown in FIG. 16, the chassis attachment plate 330 is attached onto the chassis B4 by assembling the assembly bolt 393 while the chassis assembly hole 333 and the assembly hole B4b communicate with each other.

Specifically, the assembly bolt 393 is attached to penetrate the spacer 392, the vibration suppressing member 391, the chassis assembly hole 333, and the assembly hole B4b of the chassis B4 from above.

Therefore, it is possible to efficiently attach the chassis attachment plate 330 and the vibration suppressing unit 390 to the chassis B4.

Further, in the above-described configuration, as shown in FIGS. 14 and 16, the vibration suppressing member 391 includes a first vibration suppressing member 391A that is attached to the chassis assembly hole 333 (the second chassis assembly hole 334) and a second vibration suppressing member 391B that is attached to the attachment hole 331.

The first vibration suppressing member 391A is disposed to surround the motor device 370 and the second vibration suppressing member 391B.

In other words, the first vibration suppressing member 391A is disposed to sandwich the motor device 370 and the second vibration suppressing member 391B in the front to back direction of the seat and the width direction of the seat.

Further, the first vibration suppressing member 391A comes into contact with the upper surface of the chassis B4 (the chassis auxiliary plate B4a) while being fitted to the chassis assembly hole 333 (the second chassis assembly hole 334).

Figure 17:
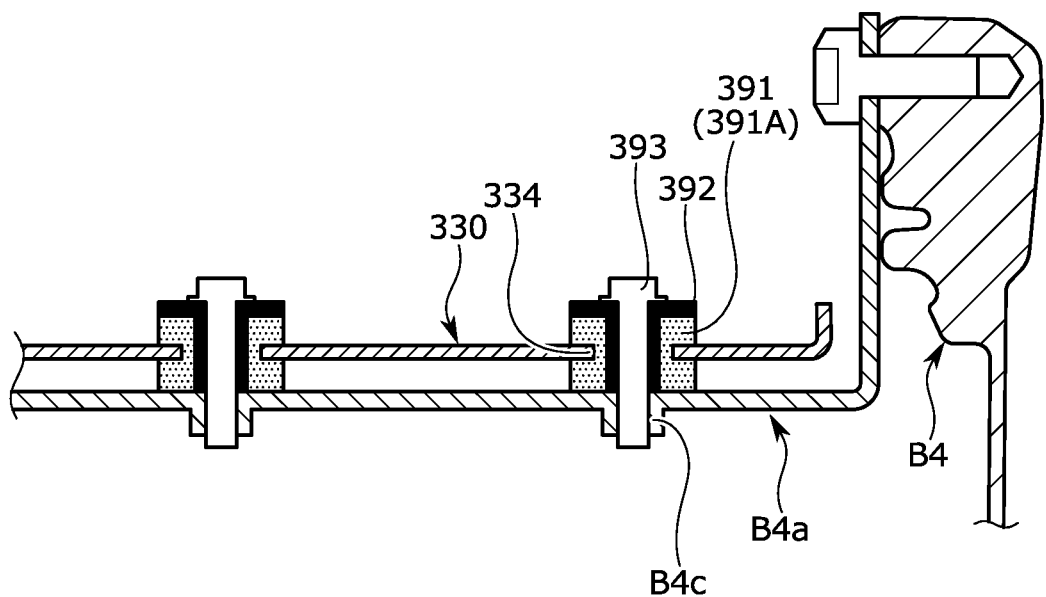
FIG. 17 is a cross-section B-B of FIG. 14 and a diagram showing an assembly structure of the vibration suppressing member.

Therefore, as shown in FIGS. 16 and 17, the seat height adjustment unit 310 is indirectly attached onto the chassis B4 through the vibration suppressing unit 390. As a result, it is possible to efficiently suppress the vibration transmitted from the chassis B4 to the seat height adjustment unit 310.

Further, in the above-described configuration, as shown in FIG. 16, the second vibration suppressing member 391B is disposed at intervals in the front to back direction of the seat and the width direction of the seat and comes into contact with the bottom surface of the lower link support member 350 while being fitted to the attachment hole 331.

Therefore, the seat height adjustment unit 310 (the motor device 370) is indirectly attached onto the chassis attachment plate 330 through the vibration suppressing unit 390.

As a result, it is possible to further efficiently suppress the vibration transmitted from the chassis B4 to the seat height adjustment unit 310.

Other Embodiments

In the above-described embodiment, the cover member 90 is formed as a flexible cover and is preferably formed as a flexible and stretchable cover member.

In the above-described embodiment, as shown in FIGS. 7 and 8, the cover member 90 is formed in a bag shape and is configured to enclose the upper link support member 40, the lower link support member 50, the rotation link 60, and the motor device 70. However, the cover member can be modified without particular limitation.

For example, the cover member 90 may be a flexible cover member that covers at least the rotation link 60 from the outside in the front to back direction of the seat and the width direction of the seat.

Also in the configuration of the above-described cover member, it is possible to protect the operation portion from foreign matter such as dust and dirt from entering from the outside in order to smoothly operate the rotation link 60.

Further, for example, the cover member 90 may be a flexible cover member that covers the rotation link 60 only from the outside in the width direction of the seat. Also in the configuration, it is possible to ensure the operation of the rotation link 60 compared to the related art.

In the above-described embodiment, as shown in FIGS. 7 and 8, the cover member 90 is configured to cover and enclose the front link 61 and the rear link 62, but can be modified without particular limitation.

For example, the cover member 90 may be configured to cover only the drive link (in this embodiment, the rear link 62) in the front link 61 and the rear link 62.

Further, for example, the cover member 90 may be configured to cover only one link portion 62a provided with the sector gear portion 64 in the rear link 62 which is the drive link.

In the above-described embodiment, as shown in FIG. 8, the cover overhanging portion 91 is formed by bending a part of the lateral portion of the cover member 90 outward and joining the bent portion, but is not particularly limited.

For example, as shown in FIGS. 10A and 10B, a lateral portion corresponding to the rotation link 60 (the rear link 62) in the cover member 90 may project outward when the rotation link 60 moves from the upper position to the normal position so that the cover member 90 is folded.

That is, the cover overhanging portion 91 may be simply formed by making a crease on a part of the lateral portion of the cover member 90 to the outside.

In the above-described embodiment, as shown in FIGS. 7 and 8, a pair of the cover overhanging portions 91 is disposed at the lateral portion corresponding to the right and left link portions 62a in the rear link 62 which is the drive link, but is not particularly limited.

For example, the cover overhanging portion 91 may be disposed at each of the lateral portions corresponding to the front link 61 and the rear link 62.

Further, for example, the cover overhanging portion 91 may be disposed only at the lateral portion corresponding to one link portion 62a provided with the sector gear portion 64 in the right and left link portions 62a of the rear link 62.

In the above-described embodiment, as shown in FIGS. 15A and 15B, the vibration suppressing member 391 is formed as an elastic member (elastic rubber member) having elasticity, but can be modified without particular limitation.

For example, the vibration suppressing member 391 may be an elastic spring member having elasticity or an elastic member having elasticity. Other known vibration suppressing members may be used.

In the above-described embodiment, as shown in FIG. 16, the vibration suppressing member 391 is attached to the chassis attachment plate (the chassis assembly hole 333, the attachment hole 351), but may be attached to the chassis B4 (the assembly hole B4b) or the lower link support member 350 (the attachment hole 351) without particular limitation.

In the above-described embodiment, as shown in FIG. 1, the seat device S has been described by exemplifying the seat device for motorcycles directly exposed to sunlight or directly exposed to wind, rain, or snow. However, the present invention is not limited thereto and can also be used as a saddle-type conveyance seat device used for outdoors such as a snow bike or a personal watercraft.

Further, the seat device S can also be used as a vehicle seat device for automobiles, trains, buses, or the like or a conveyance seat device for airplanes, ships, or the like in addition to the saddle-type conveyance seat device.

In this embodiment, the conveyance seat device according to the present invention has been mainly described.

However, the above-described embodiment is merely an example for facilitating the understanding of the present invention and does not limit the present invention. The present invention can be modified and improved without departing from the spirit thereof and the present invention, of course, includes an equivalent thereof.

In particular, the shape, arrangement, and configuration of the cover member 90 described in the above-described embodiment are merely examples and do not limit the present invention.

REFERENCE SIGNS LIST

B, B4: chassis (main body of conveyance)
  B4a: chassis auxiliary plate
  B4b, B4c: assembly hole (assembly portion)
S, S4: seat device (conveyance seat device)
1, 301: seat
  1a: bottom plate
  1b: cushion material
  1c: skin material
10, 110, 210, 310: seat height adjustment unit
20, 320: seat support plate
  20a: front plate portion
  20b: rear plate portion
  20c: center plate portion
21, 321: attachment hole
22: relief protrusion
23: reinforced bead
324: relief hole
30, 330: chassis attachment plate
31, 331: attachment hole (attachment portion)
32: harness passage hole
333: chassis assembly hole (chassis assembly portion)
334: second chassis assembly hole (chassis assembly portion)
40, 140, 240, 340: upper link support member
  40a: upper wall portion
  40b, 240b: side wall portion
  40c, 140c, 240c: rear wall portion
    140ca: auxiliary cover
    140cb: holding plate
    240ca: extension wall portion
41: attachment hole
42: cover attachment hole
43, 44: upper link rotation shaft
45: clip member
50, 150, 350: lower link support member
  50a: bottom wall portion
  50b: side wall portion
  50c: front wall portion
  50d, 150d: rear wall portion
51, 351: attachment hole (attachment portion)
52: cover attachment hole
53: harness passage hole
54, 55: lower link rotation shaft
56: confirmation hole
57: clip member
60, 360: rotation link
61: front link
  61a, 62a: link portion
  61b, 62b: link connection portion
62: rear link (drive link)
63: link curved portion
64: sector gear portion
70, 370: motor device
  70a: motor attachment bracket
71: motor body
72: transmission member 73: pinion gear
74: connecting rod
75: harness
 75a: harness connection portion
80, 380: ECU
81: operation button
82: sensor
90: cover member
 90a: front portion
 90b: lateral portion
  90ba: corner portion
  90bb, 90bc: ridge
 90c: rear portion
 90d: upper portion
 90e: lower portion
91: cover overhanging portion
92: upper opening hole
 92a: center portion
 92b: slit hole portion
93: upper cover attachment portion
94: lower opening hole
 94a: center portion
 94b: slit hole portion
95: lower cover attachment portion
96: lateral protrusion
97: lateral concave portion
98: rear concave portion
99: front concave portion
390: vibration suppressing unit
391: vibration suppressing member
391A: first vibration suppressing member
391B: second vibration suppressing member
 391a: main body portion
 391b: upper flange portion
 391c: lower flange portion
 391d: through hole
 391e, 391f: groove
392: spacer
 392a: spacer body
 392b: flange portion
 392c: through hole
393: assembly bolt
G: gap
D1, D2, D3, D4: distance

The invention claimed is:
1. A conveyance seat device, comprising:
a saddle-type seat on which an occupant of a conveyance sits to straddle; and
a seat height adjustment unit which is attached below the seat and is able to adjust a height position of the seat,
wherein the seat height adjustment unit includes:
 a rotation link which rotates together with the seat with respect to a main body of the conveyance to adjust the height position of the seat,
 a motor device which rotates the rotation link,
 a harness which supplies electric power to the motor device,
 a flexible cover member that covers the rotation link and the motor device from the outside in a front to back direction of the seat and a width direction of the seat,
 a plate-shaped upper link support member provided between the seat and the rotation link and is used so that an upper end portion of the rotation link is attached thereto, and
 a lower link support member provided between the rotation link and the main body of the conveyance and is used so that a lower end portion of the rotation link is attached thereto;
wherein the rotation link and the motor device are covered by the cover member, the upper link support member, and the lower link support member; and
wherein a harness passage hole for inserting the harness is formed in a bottom wall portion of the lower link support member.
2. The conveyance seat device according to claim 1,
wherein the cover member has a bag shape and is configured to wrap the rotation link, the upper link support member, and the lower link support member.
3. The conveyance seat device according to claim 1,
wherein the cover member is a polyhedron which is formed by joining terminals of a plurality of seat materials, and
wherein a portion formed by joining the terminals is located on a ridge of the cover member.
4. The conveyance seat device according to claim 1,
wherein the seat height adjustment unit is able to move the seat between a normal position and an upper position in which the seat is moved above the normal position,
wherein the cover member changes its shape in accordance with a movement operation of the seat and is configured to be folded when the seat moves from the upper position to the normal position, and
wherein the cover member includes a cover overhanging portion which is provided so that a lateral portion corresponding to the rotation link in the cover member projects outward when the cover member is folded.
5. The conveyance seat device according to claim 4,
wherein the cover overhanging portion is formed by bending a part of the lateral portion of the cover member outward and is disposed at a peripheral position of a corner portion located at a position closest to the rotation link among a plurality of corner portions in the lateral portion of the cover member.
6. The conveyance seat device according to claim 5,
wherein the cover overhanging portion is formed by joining the bent portion and is disposed between two ridges defining the corner portion in the lateral portion of the cover member.
7. The conveyance seat device according to claim 6,
wherein the rotation link includes a front link and a rear link which are disposed at different positions in the front to back direction of the seat, and
wherein the cover overhanging portion is disposed at a lateral portion corresponding to a link serving as a drive link in the front link and the rear link and extends along a center line between two ridges defining the corner portion while starting from the corner portion located at a position closest to the drive link in the lateral portion of the cover member.
8. The conveyance seat device according to claim 1,
wherein each of an upper surface and a bottom surface of the cover member is provided with an opening hole taking in or taking out components of the seat height adjustment unit,
wherein the upper opening hole formed in the upper surface of the cover member is disposed at a position corresponding to an upper surface of the upper link support member, and wherein the lower opening hole formed in the bottom surface of the cover member is disposed at a position corresponding to a bottom surface of the lower link support member.

9. The conveyance seat device according to claim 8, wherein a center hole portion provided at a center portion of each of the upper surface and the bottom surface of the cover member and a plurality of slit hole portions radially extending from the center hole portion and having a slit shape are formed as the opening hole formed in each of the upper surface and the bottom surface of the cover member,
wherein the upper surface and the bottom surface of the cover member are respectively provided with an upper cover attachment portion and a lower cover attachment portion used to be attached to the upper link support member and the lower link support member, and
wherein each of the upper cover attachment portion and the lower cover attachment portion is disposed between the slit hole portions formed to be adjacent to each other in the surface of the cover member.

10. The conveyance seat device according to claim 1, further comprising:
vibration suppressing members that are attached between the seat height adjustment unit and the main body of the conveyance in an up to down direction and suppresses vibration transmitted from the main body of the conveyance to the seat height adjustment unit,
wherein the vibration suppressing members are arranged at predetermined intervals in the front to back direction of the seat and the width direction of the seat.

11. The conveyance seat device according to claim 10, wherein the seat height adjustment unit includes a chassis attachment plate which is attached onto the main body of the conveyance,
wherein a chassis assembly portion for vertically assembling to an assembled portion provided in the main body of the conveyance is formed in the chassis attachment plate, and
wherein the vibration suppressing member is attached to the chassis assembly portion or the assembled portion.

12. The conveyance seat device according to claim 11, wherein the chassis attachment plate is attached onto the main body of the conveyance by assembling an assembly bolt while a chassis assembly hole serving as the chassis assembly portion and an assembly hole serving as the assembled portion communicate with each other,
wherein the vibration suppressing member is fitted and attached to the chassis assembly hole, and
wherein the vibration suppressing member includes a through hole through which the assembly bolt penetrates.

13. The conveyance seat device according to claim 11, wherein the seat height adjustment unit includes a lower link support member that is provided between the rotation link and the chassis attachment plate and is used so that a lower end portion of the rotation link is attached thereto,
wherein the chassis attachment plate is provided with an attachment portion for vertically attaching to an attached portion provided in the lower link support member,
wherein the vibration suppressing member includes a first vibration suppressing member that is attached to the chassis assembly portion or the assembled portion and a second vibration suppressing member that is attached to the attachment portion or the attached portion, and wherein a plurality of the first vibration suppressing members is arranged to sandwich the second vibration suppressing member in the front to back direction of the seat and the width direction of the seat.

14. The conveyance seat device according to claim 1, wherein:
the lower link support member includes a bottom wall portion which extends in the front to back direction of the seat, right and left side wall portions which continuously extend upward from both end portions of the bottom wall portion in the width direction of the seat, and a rear wall portion which continuously extend upward from a rear end portion of the bottom wall portion; and
the lower link support member is disposed to cover the rotation link and the motor device from below, a side and behind.

15. A conveyance seat device, comprising:
a saddle-type seat on which an occupant of a conveyance sits to straddle; and
a seat height adjustment unit which is attached below the seat and is able to adjust a height position of the seat,
wherein the seat height adjustment unit includes:
a rotation link which rotates together with the seat with respect to a main body of the conveyance to adjust the height position of the seat,
a motor device which rotates the rotation link,
a harness which supplies electric power to the motor device,
a flexible cover member that covers the rotation link and the motor device from the outside in a front to back direction of the seat and a width direction of the seat,
a plate-shaped upper link support member provided between the seat and the rotation link and is used so that an upper end portion of the rotation link is attached thereto, and
a lower link support member provided between the rotation link and the main body of the conveyance and is used so that a lower end portion of the rotation link is attached thereto;
wherein the rotation link and the motor device are covered by the cover member, the upper link support member, and the lower link support member;
wherein the rotation link is covered from above, a front, a side, behind and below by the upper link support member and the lower link support member, and
wherein a harness passage hole for inserting the harness is formed in a bottom wall portion of the lower link support member.

16. The conveyance seat device according to claim 15, wherein:
the upper link support member includes an upper wall portion which extends in the front to back direction of the seat, right and left side wall portions which continuously extend downward from both end portions of the upper wall portion in the width direction of the seat, and a rear wall portion which continuously extends downward from a rear end portion of the upper wall portion; and
the upper link support member is disposed to cover the rotation link and the motor device from above, a side and behind.

17. The conveyance seat device according to claim 15, wherein the cover member has a bag shape and is configured to wrap the rotation link, the upper link support member, and the lower link support member.

18. The conveyance seat device according to claim 15, wherein:
- the cover member is a polyhedron which is formed by joining terminals of a plurality of seat materials; and
- a portion formed by joining the terminals is located on a ridge of the cover member.

19. The conveyance seat device according to claim 15, wherein:
- the seat height adjustment unit is able to move the seat between a normal position and an upper position in which the seat is moved above the normal position;
- the cover member changes its shape in accordance with a movement operation of the seat and is configured to be folded when the seat moves from the upper position to the normal position; and
- the cover member includes a cover overhanging portion which is provided so that a lateral portion corresponding to the rotation link in the cover member projects outward when the cover member is folded.

20. The conveyance seat device according to claim 15, wherein the cover overhanging portion is formed by bending a part of the lateral portion of the cover member outward and is disposed at a peripheral position of a corner portion located at a position closest to the rotation link among a plurality of corner portions in the lateral portion of the cover member.

* * * * *